US012574958B2

(12) United States Patent
Xu et al.

(10) Patent No.: US 12,574,958 B2
(45) Date of Patent: Mar. 10, 2026

(54) ENERGY DETECTION THRESHOLD FOR WIRELESS COMMUNICATION

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 17/922,170

(22) PCT Filed: May 15, 2020

(86) PCT No.: PCT/CN2020/090577
§ 371 (c)(1),
(2) Date: Oct. 28, 2022

(87) PCT Pub. No.: WO2021/227036
PCT Pub. Date: Nov. 18, 2021

(65) Prior Publication Data
US 2023/0189328 A1     Jun. 15, 2023

(51) Int. Cl.
*H04W 72/566*     (2023.01)
*H04W 74/0808*     (2024.01)

(52) U.S. Cl.
CPC ..... *H04W 72/569* (2023.01); *H04W 74/0808* (2013.01)

(58) Field of Classification Search
CPC ........................ H04W 72/569; H04W 74/0808
See application file for complete search history.

(56) References Cited

U.S. PATENT DOCUMENTS

| | | |
|---|---|---|
| 2012/0014269 A1 | 1/2012 | Ray et al. |
| 2017/0332392 A1 | 11/2017 | Miao et al. |
| (Continued) | | |

FOREIGN PATENT DOCUMENTS

| | | |
|---|---|---|
| CN | 107743693 A | 2/2018 |
| CN | 108633097 A | 10/2018 |

OTHER PUBLICATIONS

LG Electronics: "Remaining Issues of Channel Access Procedure for NR-U", R1-2001935, 3GPP TSG RAN WG 1 #100bis, 3rd Generation Partnership Project, Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 10, 2020, XP052342010, 6 Pages, Section 3, p. 3-p. 4, Section 5, p. 5-p. 6.
Supplementary European Search Report—EP20935016—Search Authority—The Hague—Dec. 1, 2023.
International Search Report and Written Opinion—PCT/CN2020/090577—ISA/EPO—Feb. 20, 2021.

(Continued)

*Primary Examiner* — Charles C Jiang
*Assistant Examiner* — Margaret Marie Anderson
(74) *Attorney, Agent, or Firm* — Loza & Loza, LLP

(57) ABSTRACT
Techniques for enabling a wireless communication device (e.g., a user equipment, UE) to select an energy detection (ED) threshold for a transmission on a wireless communication channel where access to the channel is gained through the use of a listen-before-talk (LBT) procedure. In some examples, a UE may select the ED threshold based on the priority of traffic to be transmitted during the COT. For example, a base station (e.g., gNB) may indicate a priority for uplink traffic and the UE may select an ED threshold based on that priority. In some examples, the UE may select the ED threshold based on the type of grant (e.g., dynamic grant or configured grant) that scheduled the transmission of uplink traffic during the COT. In some examples, the gNB may send information to the UE that indicates the ED (Continued)

500 threshold to be used for different priorities and/or different types of grants.

18 Claims, 18 Drawing Sheets

(56) References Cited

U.S. PATENT DOCUMENTS

| | | | |
|---|---|---|---|
| 2017/0353972 A1* | 12/2017 | Babaei | H04L 5/001 |
| 2018/0070368 A1 | 3/2018 | Quan et al. | |
| 2018/0242364 A1 | 8/2018 | Park et al. | |
| 2019/0313454 A1 | 10/2019 | Pu et al. | |
| 2020/0053798 A1 | 2/2020 | Tsai et al. | |
| 2021/0392685 A1* | 12/2021 | Myung | H04W 72/0446 |
| 2023/0171816 A1* | 6/2023 | Liu | H04W 74/0875 |
| | | | 370/329 |

OTHER PUBLICATIONS

Qualcomm Incorporated: "Channel Access Procedures for NR Unlicensed", 3GPP TSG RAN WG1 Meeting #98bis, R1-1911097, Chongqing, CN, Oct. 14, 2019-Oct. 20, 2019, Oct. 20, 2019 (Oct. 20, 2019), pp. 1-18, Sections 2.3, 2.5, the whole document.

Qualcomm Incorporated: "Enhancement to Configured Grants in NR Unlicensed", 3GPP TSG RAN WG1 Meeting #99, Reno, USA, Nov. 18, 2019-Nov. 22, 2019, R1-1912941, Nov. 22, 2019 (Nov. 22, 2019), 12 Pages, the whole document.

Vivo: "Potential Solutions and Techniques for NR Unlicensed Spectrum", 3GPP TSG RAN WG1 Meeting #92, 3GPP Draft, R1-1801557, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 15, 2018 (Feb. 15, 2018), XP051396809, 6 Pages.

* cited by examiner

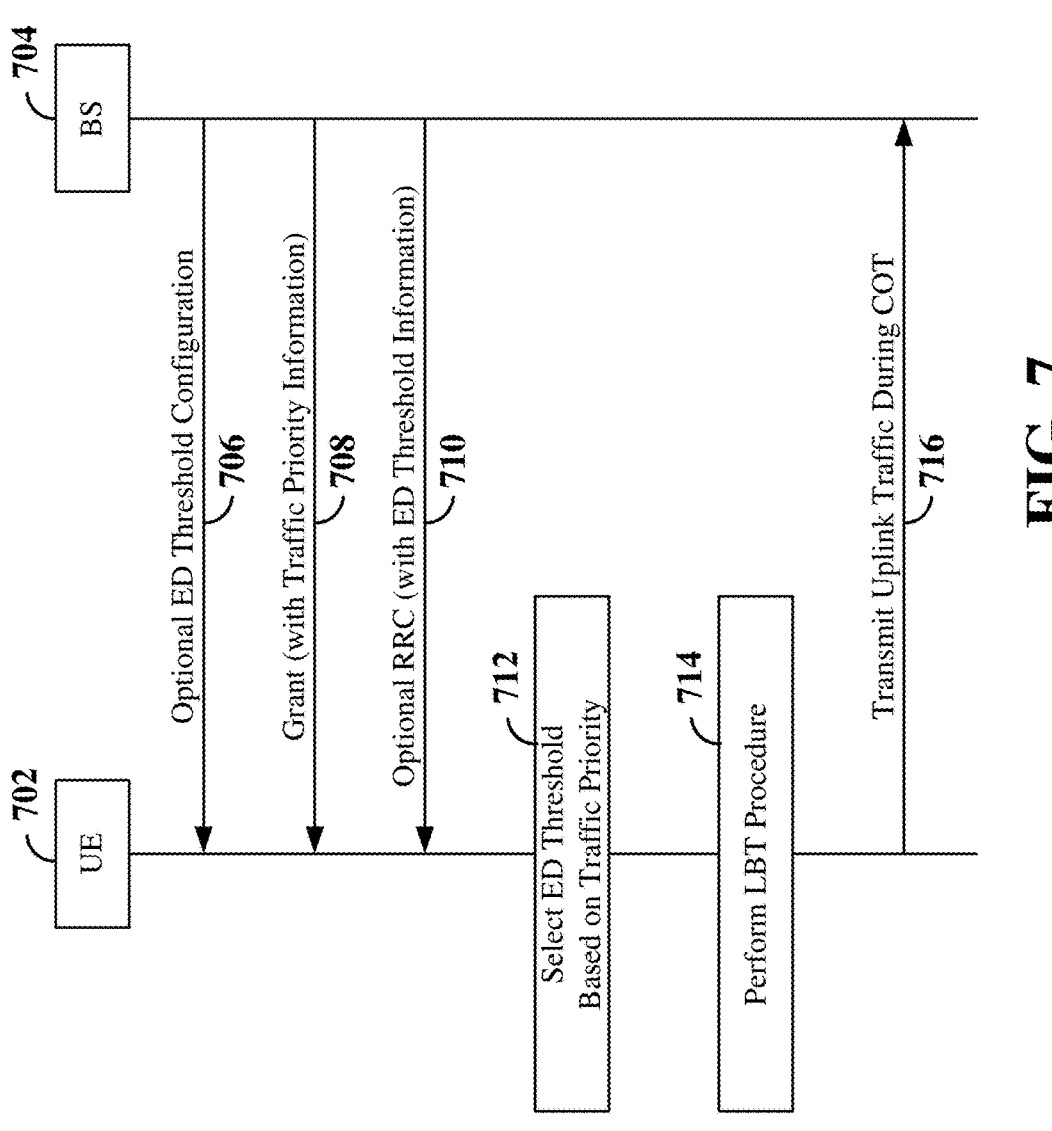
FIG. 7

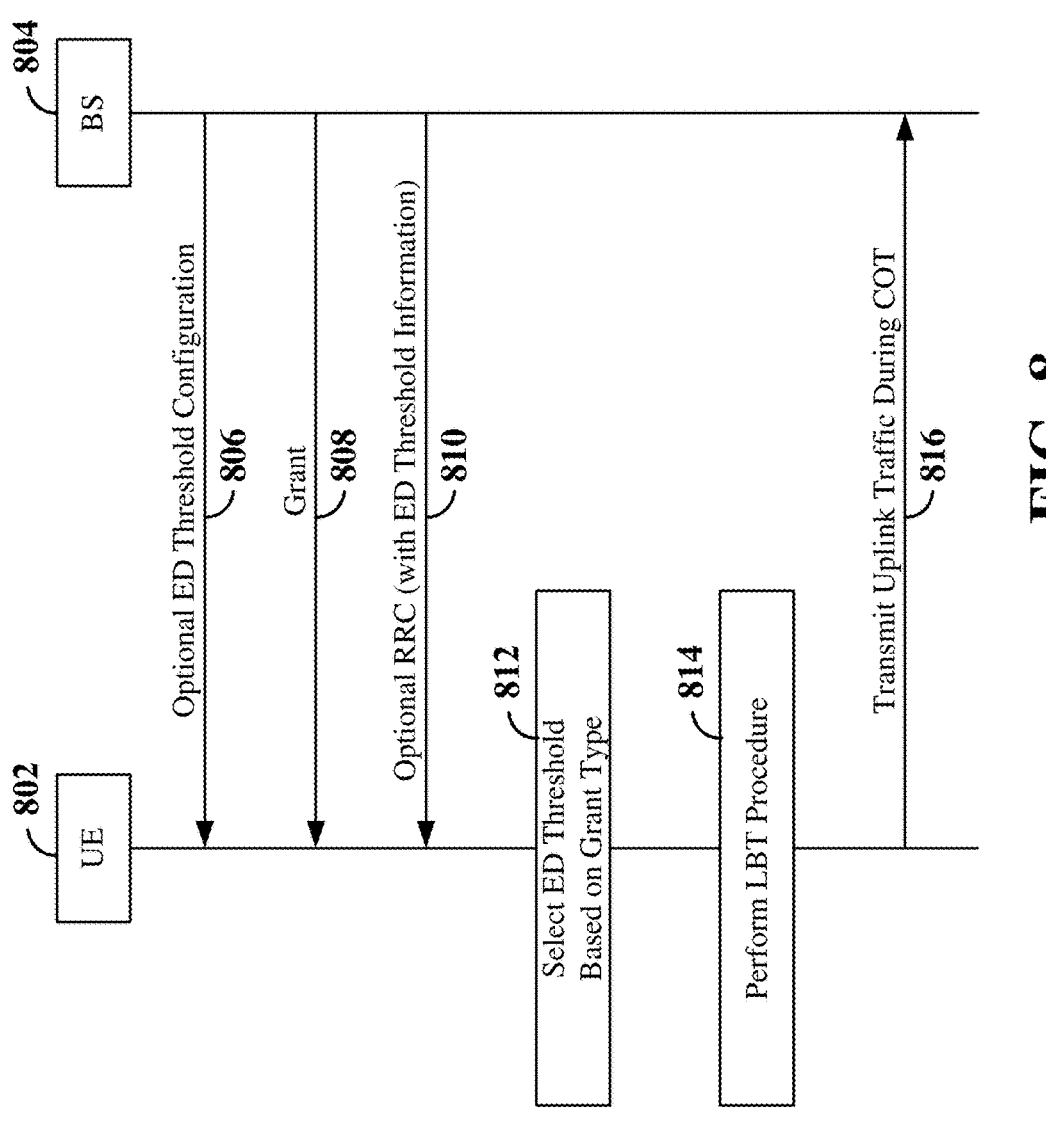
FIG. 8

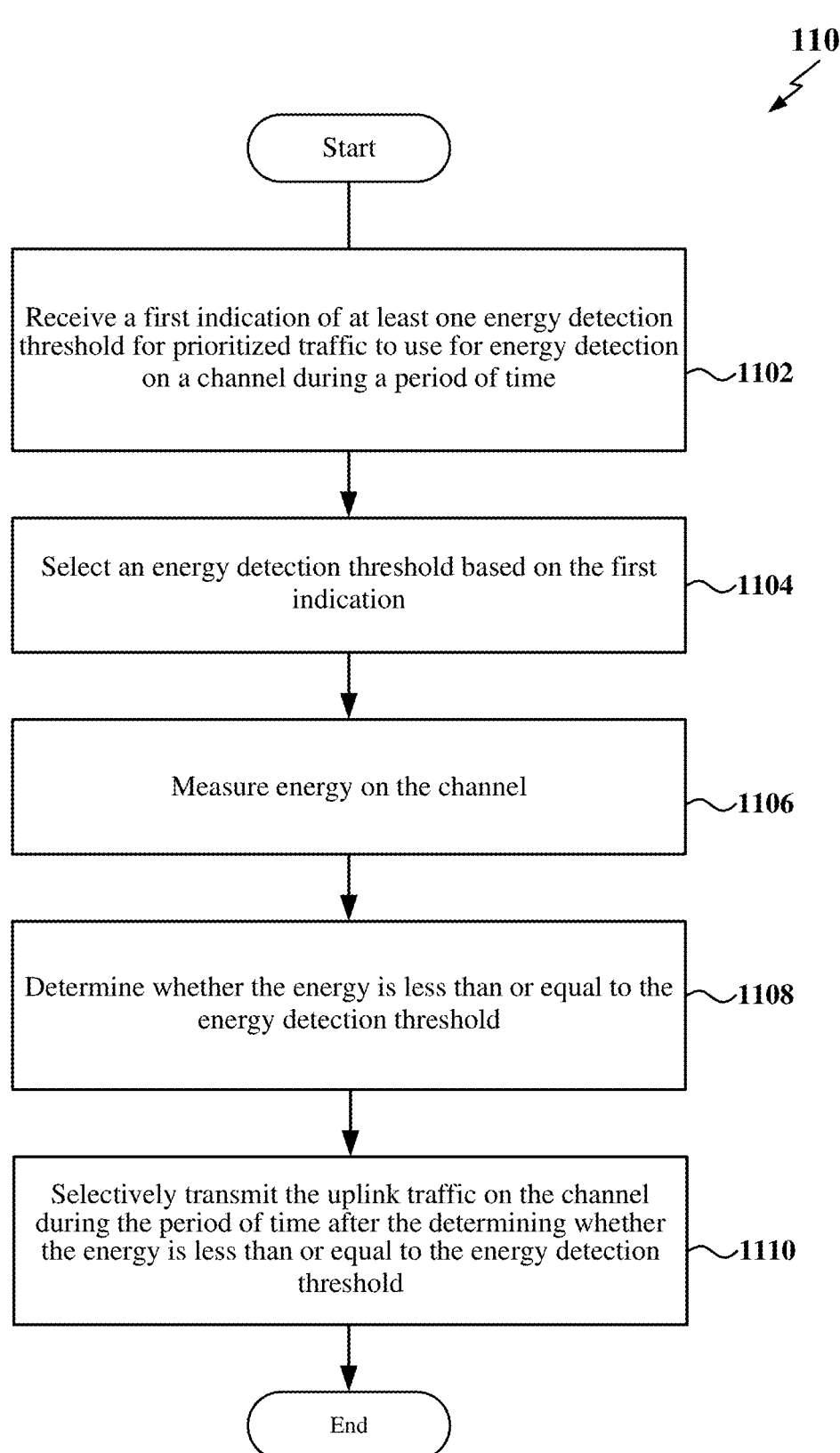

1100

Start

Receive a first indication of at least one energy detection threshold for prioritized traffic to use for energy detection on a channel during a period of time ⌐~1102

Select an energy detection threshold based on the first indication ⌐~1104

Measure energy on the channel ⌐~1106

Determine whether the energy is less than or equal to the energy detection threshold ⌐~1108

Selectively transmit the uplink traffic on the channel during the period of time after the determining whether the energy is less than or equal to the energy detection threshold ⌐~1110

End

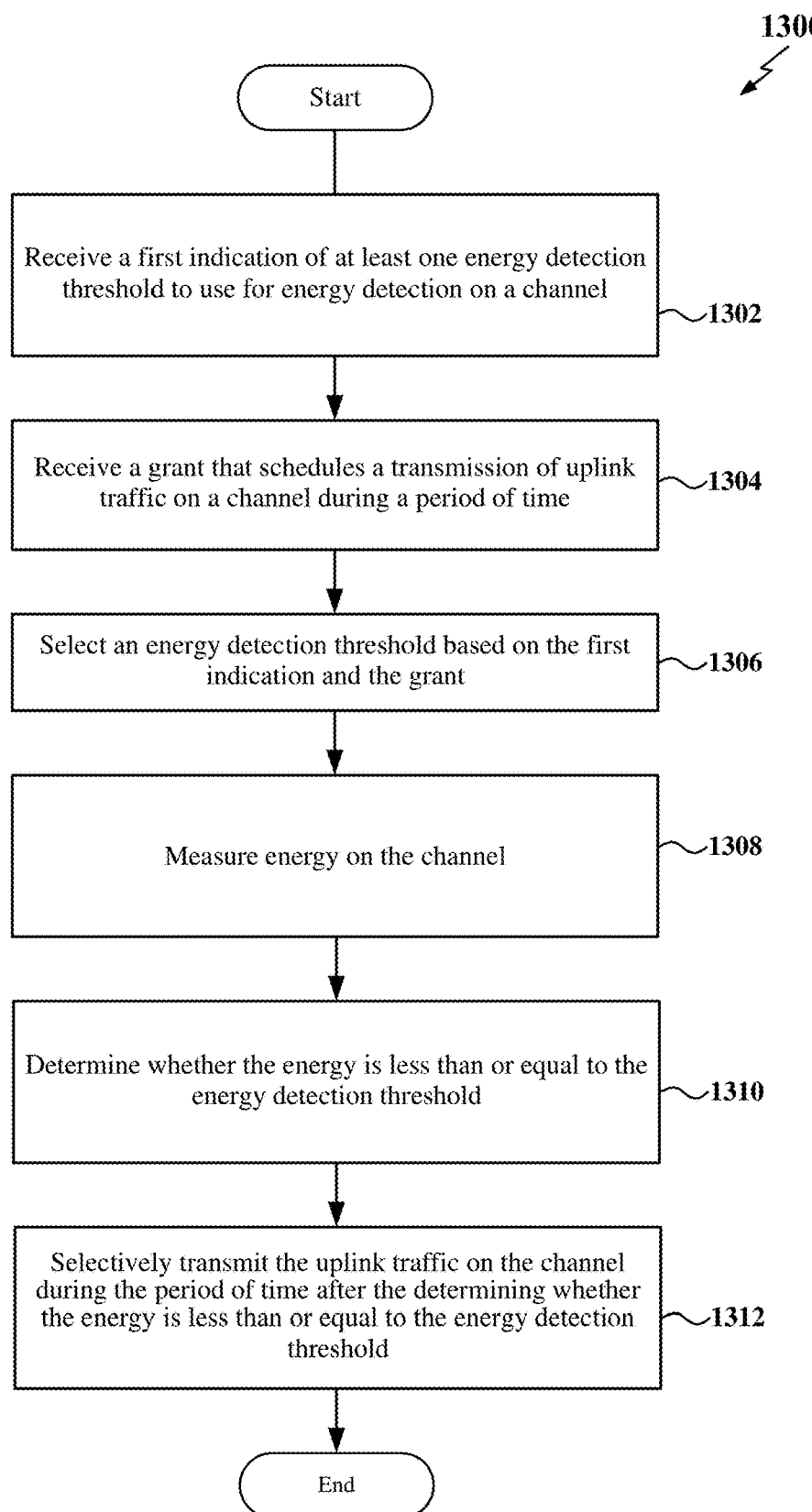

Start

Receive a first indication of at least one energy detection threshold to use for energy detection on a channel ~1302

Receive a grant that schedules a transmission of uplink traffic on a channel during a period of time ~1304

Select an energy detection threshold based on the first indication and the grant ~1306

Measure energy on the channel ~1308

Determine whether the energy is less than or equal to the energy detection threshold ~1310

Selectively transmit the uplink traffic on the channel during the period of time after the determining whether the energy is less than or equal to the energy detection threshold ~1312

End

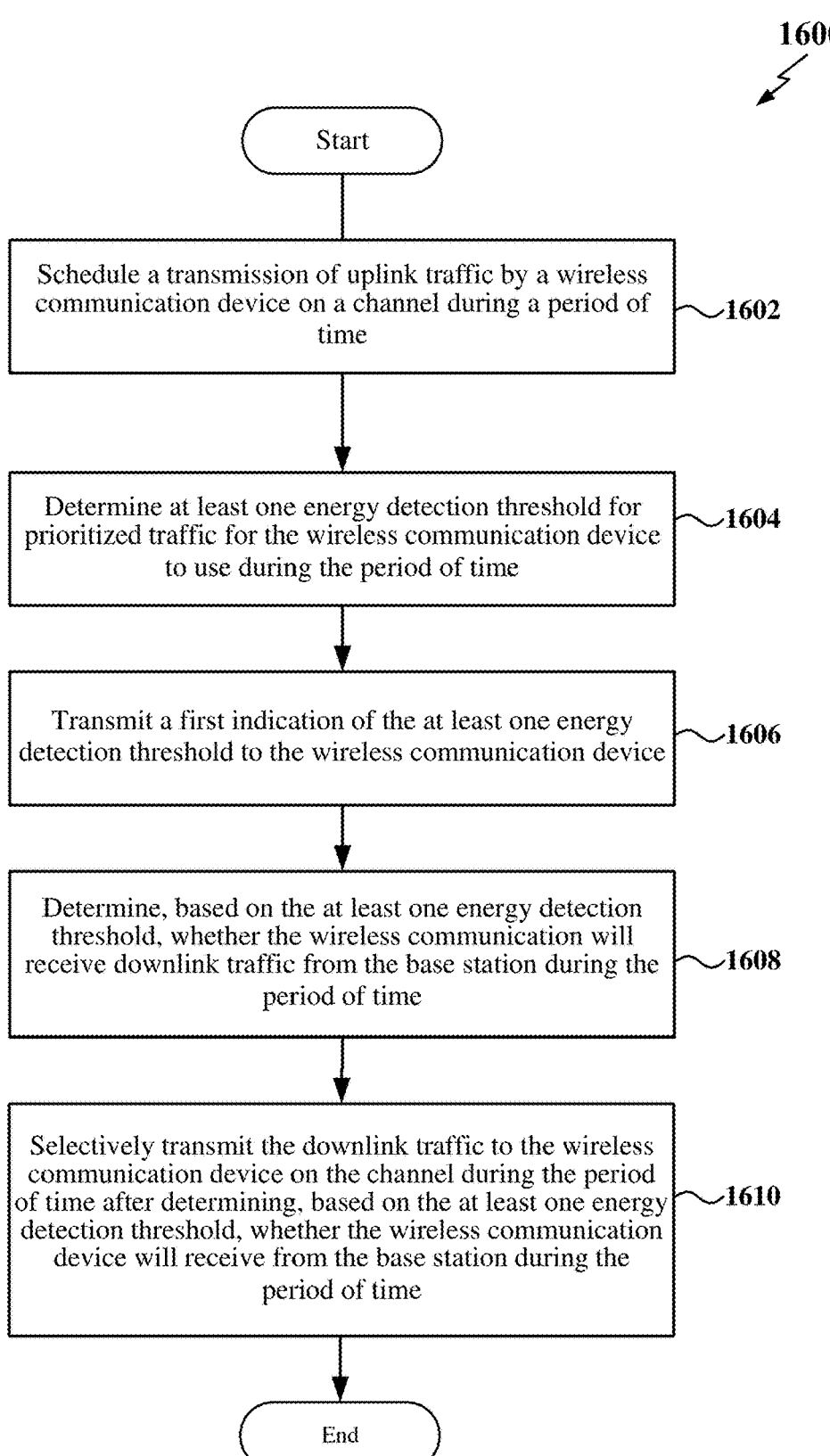

1600

Start

Schedule a transmission of uplink traffic by a wireless communication device on a channel during a period of time ⟩⟨1602

Determine at least one energy detection threshold for prioritized traffic for the wireless communication device to use during the period of time ⟩⟨1604

Transmit a first indication of the at least one energy detection threshold to the wireless communication device ⟩⟨1606

Determine, based on the at least one energy detection threshold, whether the wireless communication will receive downlink traffic from the base station during the period of time ⟩⟨1608

Selectively transmit the downlink traffic to the wireless communication device on the channel during the period of time after determining, based on the at least one energy detection threshold, whether the wireless communication device will receive from the base station during the period of time ⟩⟨1610

End

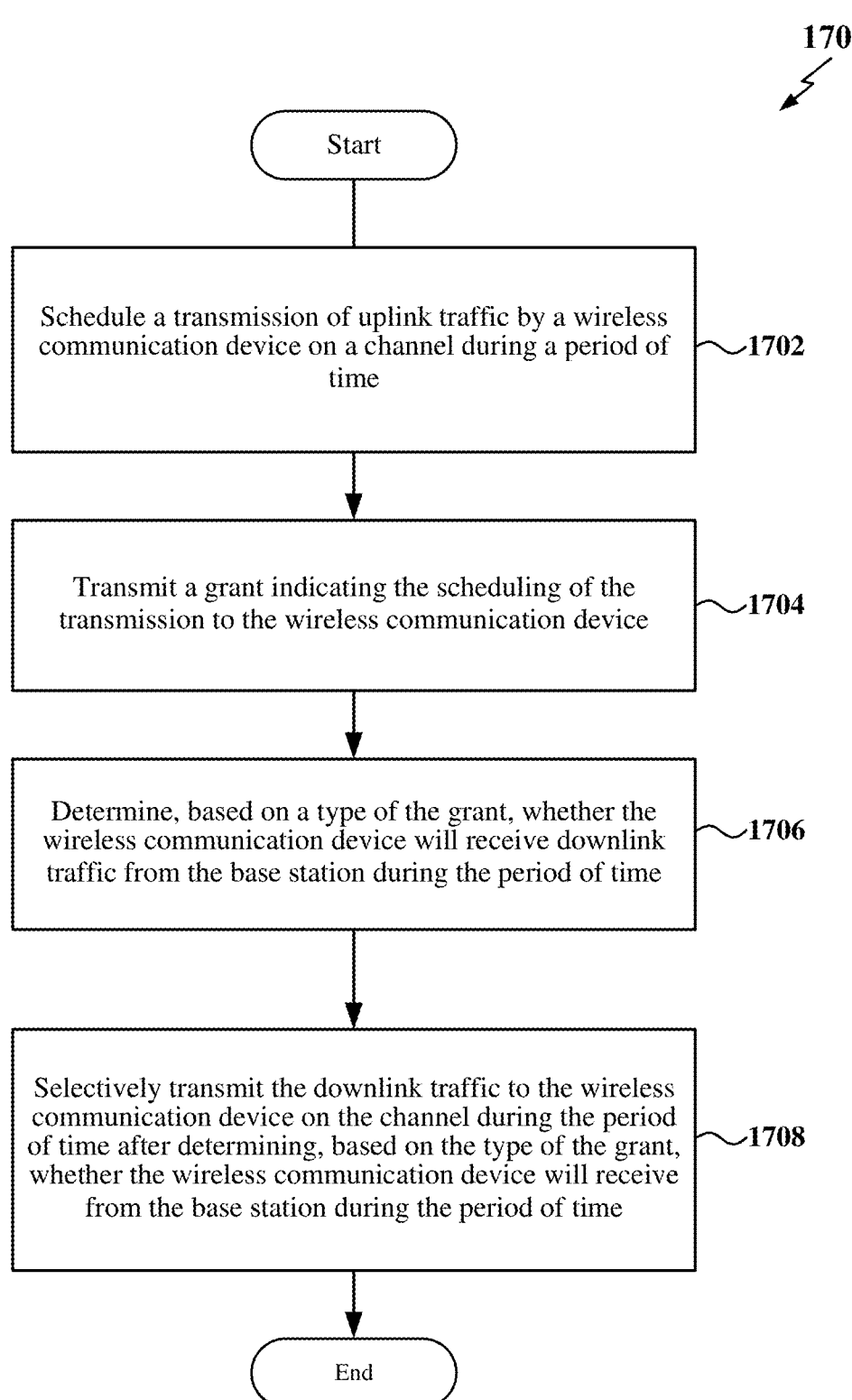

Start

Schedule a transmission of uplink traffic by a wireless communication device on a channel during a period of time ⟋1702

Transmit a grant indicating the scheduling of the transmission to the wireless communication device ⟋1704

Determine, based on a type of the grant, whether the wireless communication device will receive downlink traffic from the base station during the period of time ⟋1706

Selectively transmit the downlink traffic to the wireless communication device on the channel during the period of time after determining, based on the type of the grant, whether the wireless communication device will receive from the base station during the period of time ⟋1708

End

FIG. 17

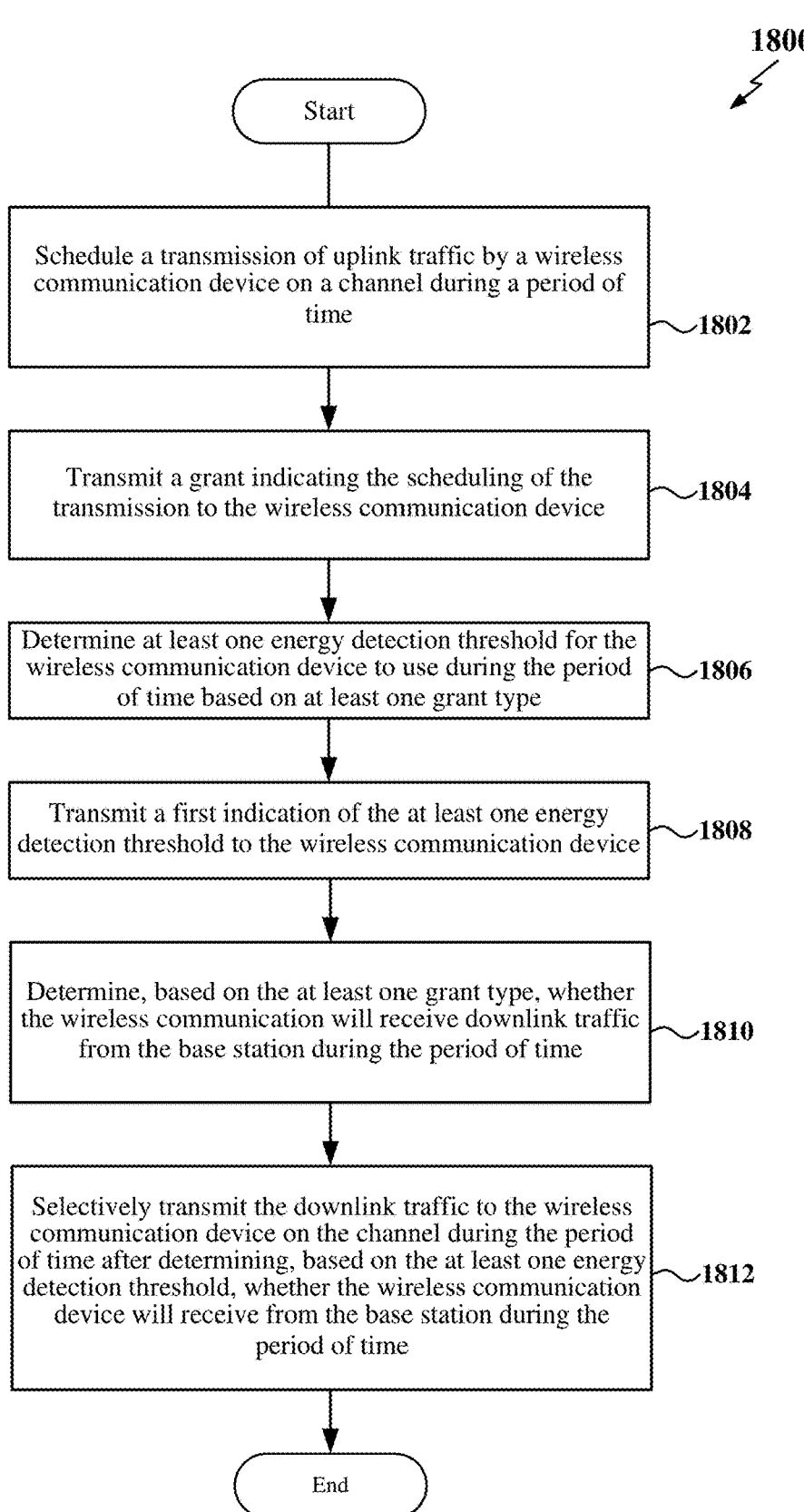

1800

Start

Schedule a transmission of uplink traffic by a wireless communication device on a channel during a period of time ~1802

Transmit a grant indicating the scheduling of the transmission to the wireless communication device ~1804

Determine at least one energy detection threshold for the wireless communication device to use during the period of time based on at least one grant type ~1806

Transmit a first indication of the at least one energy detection threshold to the wireless communication device ~1808

Determine, based on the at least one grant type, whether the wireless communication will receive downlink traffic from the base station during the period of time ~1810

Selectively transmit the downlink traffic to the wireless communication device on the channel during the period of time after determining, based on the at least one energy detection threshold, whether the wireless communication device will receive from the base station during the period of time ~1812

End

FIG. 18

ENERGY DETECTION THRESHOLD FOR WIRELESS COMMUNICATION

CROSS-REFERENCE TO RELATED APPLICATION(S)

This application is the U.S. national stage of PCT patent application number PCT/CN2020/090577 filed on May 15, 2020.

TECHNICAL FIELD

The technology discussed below relates generally to wireless communication and, more particularly, to an energy detection threshold that is used for detecting energy on a wireless communication channel.

BACKGROUND

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

As the demand for mobile broadband access continues to increase, research and development continue to advance communication technologies, including technologies for enhancing communication within a wireless network in particular, not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to techniques for enabling a wireless communication device to select an energy detection threshold for a transmission on a wireless communication channel where access to the channel is gained through the use of a listen-before-talk (LBT) procedure. A base station may schedule a transmission of uplink traffic by a wireless communication device on such a channel for a period of time that may be referred to as a channel occupancy time (COT).

The wireless communication device may selectively allow the base station to transmit during the COT. For example, in some scenarios, after transmitting uplink traffic during a first portion of the COT, the wireless communication device may allow the base station to transmit downlink traffic during a subsequent portion of the COT. In other scenarios, however, the wireless communication device may send an indication to the base station that specifies that the wireless communication device is not allowing sharing of the COT. In this case, the wireless communication device may transmit uplink traffic during all, or substantially all, of the COT.

As mentioned above, the wireless communication device uses an LBT procedure to gain access to the channel. In some aspects, the LBT procedure may involve sensing (e.g., measuring) energy on the channel and comparing the sensed (e.g., measured) energy to an energy detection threshold. For example, if the sensed energy is at or below a threshold level (e.g., indicating that the channel is relatively free of traffic), the wireless communication device may elect to transmit on the channel during the COB. Conventionally, a base station may select the energy detection threshold for the wireless communication device.

Several wireless communication device techniques and base station techniques are described herein to enable the wireless communication device to select an energy detection threshold. In some examples, the wireless communication device may select the energy detection threshold based on the priority of traffic (e.g., data) to be transmitted during the COT. For example, a base station may indicate the priority of uplink traffic and the wireless communication device may select an energy detection threshold based on that priority (e.g., a higher threshold is selected for higher priority traffic). In some examples, the wireless communication device may select the energy detection threshold based on the type of grant that scheduled the transmission of the uplink traffic during the COT. For example, a higher threshold may be selected for traffic scheduled by a dynamic grant as opposed to traffic scheduled by a configured grant, or vice versa. In some examples, a base station may send information to the wireless communication device that indicates the energy detection threshold to be used for different priorities and/or different types of grants.

In some examples, a method of communication at a wireless communication device may include receiving an indication of a priority of uplink traffic that is scheduled for transmission on a channel during a period of time, selecting an energy detection threshold based on the priority, measuring energy on the channel, determining whether the energy is less than or equal to the energy detection threshold, and selectively transmitting the uplink traffic on the channel during the period of time after the determining whether the energy is less than or equal to the energy detection threshold.

In some examples, a wireless communication device may include a transceiver, a memory, and a processor communicatively coupled to the transceiver and the memory. The processor and the memory may be configured to receive an indication of a priority of uplink traffic that is scheduled for transmission on a channel during a period of time, select an energy detection threshold based on the priority, measure energy on the channel, determine whether the energy is less than or equal to the energy detection threshold, and selectively transmit the uplink traffic on the channel during the period of time after the determining whether the energy is less than or equal to the energy detection threshold.

In some examples, a wireless communication device may include means for receiving an indication of a priority of uplink traffic that is scheduled for transmission on a channel during a period of time, means for selecting an energy detection threshold based on the priority, means for measuring energy on the channel, means for determining whether the energy is less than or equal to the energy detection threshold, and means for selectively transmitting the uplink traffic on the channel during the period of time after the determining whether the energy is less than or equal to the energy detection threshold.

In some examples, an article of manufacture for use by a wireless communication device includes a computer-readable medium having stored therein instructions executable by one or more processors of the wireless communication device to receive an indication of a priority of uplink traffic that is scheduled for transmission on a channel during a period of time, select an energy detection threshold based on the priority, measure energy on the channel, determine whether the energy is less than or equal to the energy detection threshold, and selectively transmit the uplink traffic on the channel during the period of time after the determining whether the energy is less than or equal to the energy detection threshold.

In some examples, a method of communication at a base station may include scheduling a transmission of uplink traffic by a wireless communication device on a channel during a period of time, transmitting an indication of a priority of the uplink traffic to the wireless communication device, determining, based on the priority, whether the wireless communication device will receive downlink traffic from the base station during the period of time, and selectively transmitting the downlink traffic to the wireless communication device on the channel during the period of time after determining, based on the priority, whether the wireless communication device will receive from the base station during the period of time.

In some examples, a base station may include a transceiver, a memory, and a processor communicatively coupled to the transceiver and the memory. The processor and the memory may be configured to schedule a transmission of uplink traffic by a wireless communication device on a channel during a period of time, transmit an indication of a priority of the uplink traffic to the wireless communication device, determine, based on the priority, whether the wireless communication device will receive downlink traffic from the base station during the period of time, and selectively transmit the downlink traffic to the wireless communication device on the channel during the period of time after determining, based on the priority, whether the wireless communication device will receive from the base station during the period of time.

In some examples, a base station may include means for scheduling a transmission of uplink traffic by a wireless communication device on a channel during a period of time, means for transmitting an indication of a priority of the uplink traffic to the wireless communication device, means for determining, based on the priority, whether the wireless communication device will receive downlink traffic from the base station during the period of time, and means for selectively transmitting the downlink traffic to the wireless communication device on the channel during the period of time after determining, based on the priority, whether the wireless communication device will receive from the base station during the period of time.

In some examples, an article of manufacture for use by a base station includes a computer-readable medium having stored therein instructions executable by one or more processors of the base station to schedule a transmission of uplink traffic by a wireless communication device on a channel during a period of time, transmit an indication of a priority of the uplink traffic to the wireless communication device, determine, based on the priority, whether the wireless communication device will receive downlink traffic from the base station during the period of time, and selectively transmit the downlink traffic to the wireless communication device on the channel during the period of time after determining, based on the priority, whether the wireless communication device will receive from the base station during the period of time.

In some examples, a method of communication at a wireless communication device may include receiving a first indication of at least one energy detection threshold for prioritized traffic to use for energy detection on a channel during a period of time, selecting an energy detection threshold based on the first indication, measuring energy on the channel, determining whether the energy is less than or equal to the energy detection threshold, and selectively transmitting the uplink traffic on the channel during the period of time after the determining whether the energy is less than or equal to the energy detection threshold.

In some examples, a wireless communication device may include a transceiver, a memory, and a processor communicatively coupled to the transceiver and the memory. The processor and the memory may be configured to receive a first indication of at least one energy detection threshold for prioritized traffic to use for energy detection on a channel during a period of time, select an energy detection threshold based on the first indication, measure energy on the channel, determine whether the energy is less than or equal to the energy detection threshold, and selectively transmit the uplink traffic on the channel during the period of time after the determining whether the energy is less than or equal to the energy detection threshold.

In some examples, a wireless communication device may include means for receiving a first indication of at least one energy detection threshold for prioritized traffic to use for energy detection on a channel during a period of time, means for selecting an energy detection threshold based on the first indication, means for measuring energy on the channel, means for determining whether the energy is less than or equal to the energy detection threshold, and means for selectively transmitting the uplink traffic on the channel during the period of time after the determining whether the energy is less than or equal to the energy detection threshold.

In some examples, an article of manufacture for use by a wireless communication device includes a computer-readable medium having stored therein instructions executable by one or more processors of the wireless communication device to receive a first indication of at least one energy detection threshold for prioritized traffic to use for energy detection on a channel during a period of time, select an energy detection threshold based on the first indication, measure energy on the channel, determine whether the energy is less than or equal to the energy detection threshold, and selectively transmit the uplink traffic on the channel during the period of time after the determining whether the energy is less than or equal to the energy detection threshold.

In some examples, a method of communication at a base station may include scheduling a transmission of uplink traffic by a wireless communication device on a channel during a period of time, determining at least one energy detection threshold for prioritized traffic for the wireless communication device to use during the period of time, transmitting a first indication of the at least one energy detection threshold to the wireless communication device, determining, based on the at least one energy detection threshold, whether the wireless communication device will receive downlink traffic from the base station during the period of time, and selectively transmitting the downlink traffic to the wireless communication device on the channel during the period of time after determining, based on the at least one energy detection threshold, whether the wireless communication device will receive from the base station during the period of time.

In some examples, a base station may include a transceiver, a memory, and a processor communicatively coupled to the transceiver and the memory. The processor and the memory may be configured to schedule a transmission of uplink traffic by a wireless communication device on a channel during a period of time, determine at least one energy detection threshold for prioritized traffic for the wireless communication device to use during the period of time, transmit a first indication of the at least one energy detection threshold to the wireless communication device, determine, based on the at least one energy detection threshold, whether the wireless communication device will receive downlink traffic from the base station during the period of time, and selectively transmit the downlink traffic to the wireless communication device on the channel during the period of time after determining, based on the at least one energy detection threshold, whether the wireless communication device will receive from the base station during the period of time.

In some examples, a base station may include means for scheduling a transmission of uplink traffic by a wireless communication device on a channel during a period of time, means for determining at least one energy detection threshold for prioritized traffic for the wireless communication device to use during the period of time, means for transmitting a first indication of the at least one energy detection threshold to the wireless communication device, means for determining, based on the at least one energy detection threshold, whether the wireless communication device will receive downlink traffic from the base station during the period of time, and means for selectively transmitting the downlink traffic to the wireless communication device on the channel during the period of time after determining, based on the at least one energy detection threshold, whether the wireless communication device will receive from the base station during the period of time.

In some examples, an article of manufacture for use by a base station includes a computer-readable medium having stored therein instructions executable by one or more processors of the base station to schedule a transmission of uplink traffic by a wireless communication device on a channel during a period of time, determine at least one energy detection threshold for prioritized traffic for the wireless communication device to use during the period of time, transmit a first indication of the at least one energy detection threshold to the wireless communication device, determine, based on the at least one energy detection threshold, whether the wireless communication device will receive downlink traffic from the base station during the period of time, and selectively transmit the downlink traffic to the wireless communication device on the channel during the period of time after determining, based on the at least one energy detection threshold, whether the wireless communication device will receive from the base station during the period of time.

In some examples, a method of communication at a wireless communication device may include receiving a grant that schedules a transmission of uplink traffic on a channel during a period of time, determining a type of the grant, selecting an energy detection threshold based on the type of the grant, measuring energy on the channel, determining whether the energy is less than or equal to the energy detection threshold, and selectively transmitting the uplink traffic on the channel during the period of time after determining whether the energy is less than or equal to the energy detection threshold.

In some examples, a wireless communication device may include a transceiver, a memory, and a processor communicatively coupled to the transceiver and the memory. The processor and the memory may be configured to receive a grant that schedules a transmission of uplink traffic on a channel during a period of time, determine a type of the grant, select an energy detection threshold based on the type of the grant, measure energy on the channel, determine whether the energy is less than or equal to the energy detection threshold, and selectively transmit the uplink traffic on the channel during the period of time after determining whether the energy is less than or equal to the energy detection threshold.

In some examples, a wireless communication device may include means for receiving a grant that schedules a transmission of uplink traffic on a channel during a period of time, means for determining a type of the grant, means for selecting an energy detection threshold based on the type of the grant, means for measuring energy on the channel, means for determining whether the energy is less than or equal to the energy detection threshold, and means for selectively transmitting the uplink traffic on the channel during the period of time after the determining whether the energy is less than or equal to the energy detection threshold.

In some examples, an article of manufacture for use by a wireless communication device includes a computer-readable medium having stored therein instructions executable by one or more processors of the wireless communication device to receive a grant that schedules a transmission of uplink traffic on a channel during a period of time, determine a type of the grant, select an energy detection threshold based on the type of the grant, measure energy on the channel, determine whether the energy is less than or equal to the energy detection threshold, and selectively transmit the uplink traffic on the channel during the period of time after the determining whether the energy is less than or equal to the energy detection threshold.

In some examples, a method of communication at a base station may include scheduling a transmission of uplink traffic by a wireless communication device on a channel during a period of time, transmitting a grant indicating the scheduling of the transmission to the wireless communication device, determining, based on a type of the grant, whether the wireless communication device will receive downlink traffic from the base station during the period of time, and selectively transmitting the downlink traffic to the wireless communication device on the channel during the period of time after determining, based on the type of the grant, whether the wireless communication device will receive from the base station during the period of time.

In some examples, a base station may include a transceiver, a memory, and a processor communicatively coupled to the transceiver and the memory. The processor and the memory may be configured to schedule a transmission of uplink traffic by a wireless communication device on a channel during a period of time, transmit a grant indicating the scheduling of the transmission to the wireless communication device, determine, based on a type of the grant, whether the wireless communication device will receive downlink traffic from the base station during the period of time, and selectively transmit the downlink traffic to the wireless communication device on the channel during the period of time after determining, based on the type of the grant, whether the wireless communication device will receive from the base station during the period of time.

In some examples, a base station may include means for scheduling a transmission of uplink traffic by a wireless communication device on a channel during a period of time, means for transmitting a grant indicating the scheduling of the transmission to the wireless communication device, means for determining, based on a type of the grant, whether the wireless communication device will receive downlink traffic from the base station during the period of time, and means for selectively transmitting the downlink traffic to the wireless communication device on the channel during the period of time after determining, based on the type of the grant, whether the wireless communication device will receive from the base station during the period of time.

In some examples, an article of manufacture for use by a base station includes a computer-readable medium having stored therein instructions executable by one or more processors of the base station to schedule a transmission of uplink traffic by a wireless communication device on a channel during a period of time, transmit a grant indicating the scheduling of the transmission to the wireless communication device, determine, based on a type of the grant, whether the wireless communication device will receive downlink traffic from the base station during the period of time, and selectively transmit the downlink traffic to the wireless communication device on the channel during the period of time after determining, based on the type of the grant, whether the wireless communication device will receive from the base station during the period of time.

In some examples, a method of communication at a wireless communication device may include receiving a first indication of at least one energy detection threshold to use for energy detection on a channel, receiving a grant that schedules a transmission of uplink traffic on the channel during a period of time, selecting an energy detection threshold based on the first indication and the grant, measuring energy on the channel, determining whether the energy is less than or equal to the energy detection threshold, and selectively transmitting the uplink traffic on the channel during the period of time after the determining whether the energy is less than or equal to the energy detection threshold.

In some examples, a wireless communication device may include a transceiver, a memory, and a processor communicatively coupled to the transceiver and the memory. The processor and the memory may be configured to receive a first indication of at least one energy detection threshold to use for energy detection on a channel, receive a grant that schedules a transmission of uplink traffic on the channel during a period of time, select an energy detection threshold based on the first indication and the grant, measure energy on the channel, determine whether the energy is less than or equal to the energy detection threshold, and selectively transmit the uplink traffic on the channel during the period of time after the determining whether the energy is less than or equal to the energy detection threshold.

In some examples, a wireless communication device may include means for receiving a first indication of at least one energy detection threshold to use for energy detection on a channel, means for receiving a grant that schedules a transmission of uplink traffic on the channel during a period of time, means for selecting an energy detection threshold based on the first indication and the grant, means for measuring energy on the channel, means for determining whether the energy is less than or equal to the energy detection threshold, and means for selectively transmitting the uplink traffic on the channel during the period of time after the determining whether the energy is less than or equal to the energy detection threshold.

In some examples, an article of manufacture for use by a wireless communication device includes a computer-readable medium having stored therein instructions executable by one or more processors of the wireless communication device to receive a first indication of at least one energy detection threshold to use for energy detection on a channel, receive a grant that schedules a transmission of uplink traffic on the channel during a period of time, select an energy detection threshold based on the first indication and the grant, measure energy on the channel, determine whether the energy is less than or equal to the energy detection threshold, and selectively transmit the uplink traffic on the channel during the period of time after the determining whether the energy is less than or equal to the energy detection threshold.

In some examples, a method of communication at a base station may include scheduling a transmission of uplink traffic by a wireless communication device on a channel during a period of time, transmitting a grant indicating the scheduling of the transmission to the wireless communication device, determining at least one energy detection threshold for the wireless communication device to use during the period of time based on at least one grant type, transmitting a first indication of the at least one energy detection threshold to the wireless communication device, determining, based on the at least one grant type, whether the wireless communication device will receive downlink traffic from the base station during the period of time, and selectively transmitting the downlink traffic to the wireless communication device on the channel during the period of time after determining, based on the at least one energy detection threshold, whether the wireless communication device will receive from the base station during the period of time.

In some examples, a base station may include a transceiver, a memory, and a processor communicatively coupled to the transceiver and the memory. The processor and the memory may be configured to schedule a transmission of uplink traffic by a wireless communication device on a channel during a period of time, transmit a grant indicating the scheduling of the transmission to the wireless communication device, determine at least one energy detection threshold for the wireless communication device to use during the period of time based on at least one grant type, transmit a first indication of the at least one energy detection threshold to the wireless communication device, determine, based on the at least one grant type, whether the wireless communication device will receive downlink traffic from the base station during the period of time, and selectively transmit the downlink traffic to the wireless communication device on the channel during the period of time after determining, based on the at least one energy detection threshold, whether the wireless communication device will receive from the base station during the period of time.

In some examples, a base station may include means for scheduling a transmission of uplink traffic by a wireless communication device on a channel during a period of time, means for transmitting a grant indicating the scheduling of the transmission to the wireless communication device, means for determining at least one energy detection threshold for the wireless communication device to use during the period of time based on at least one grant type, means for transmitting a first indication of the at least one energy detection threshold to the wireless communication device, means for determining, based on the at least one grant type, whether the wireless communication device will receive downlink traffic from the base station during the period of time, and means for selectively transmitting the downlink traffic to the wireless communication device on the channel during the period of time after determining, based on the at least one energy detection threshold, whether the wireless communication device will receive from the base station during the period of time.

In some examples, an article of manufacture for use by a base station includes a computer-readable medium having stored therein instructions executable by one or more processors of the base station to schedule a transmission of uplink traffic by a wireless communication device on a channel during a period of time, transmit a grant indicating the scheduling of the transmission to the wireless communication device, determine at least one energy detection threshold for the wireless communication device to use during the period of time based on at least one grant type, transmit a first indication of the at least one energy detection threshold to the wireless communication device, determine, based on the at least one grant type, whether the wireless communication device will receive downlink traffic from the base station during the period of time, and selectively transmit the downlink traffic to the wireless communication device on the channel during the period of time after determining, based on the at least one energy detection threshold, whether the wireless communication device will receive from the base station during the period of time.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 7 is a signaling diagram illustrating an example of ED threshold selection according to some aspects.

FIG. 8 is a signaling diagram illustrating another example of ED threshold selection according to some aspects.

FIG. 11 is a flow chart illustrating another example wireless communication process for ED threshold selection according to some aspects.

FIG. 13 is a flow chart illustrating another example wireless communication process for ED threshold selection according to some aspects.

FIG. 16 is a flow chart illustrating another example wireless communication process for scheduling a transmission according to some aspects of the disclosure.

FIG. 17 is a flow chart illustrating another example wireless communication process for scheduling a transmission according to some aspects of the disclosure.

FIG. 18 is a flow chart illustrating another example wireless communication process for scheduling a transmission according to some aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
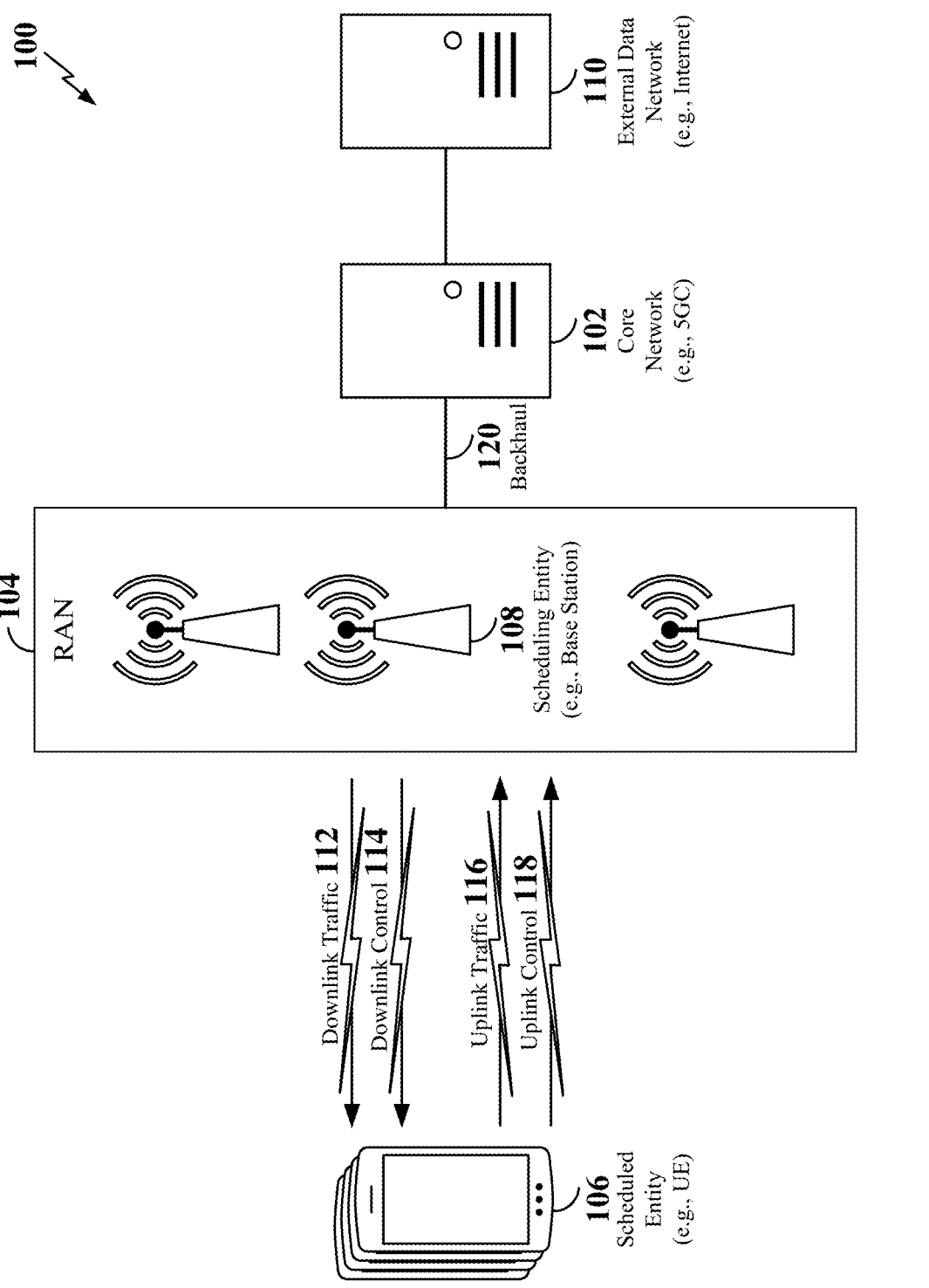
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
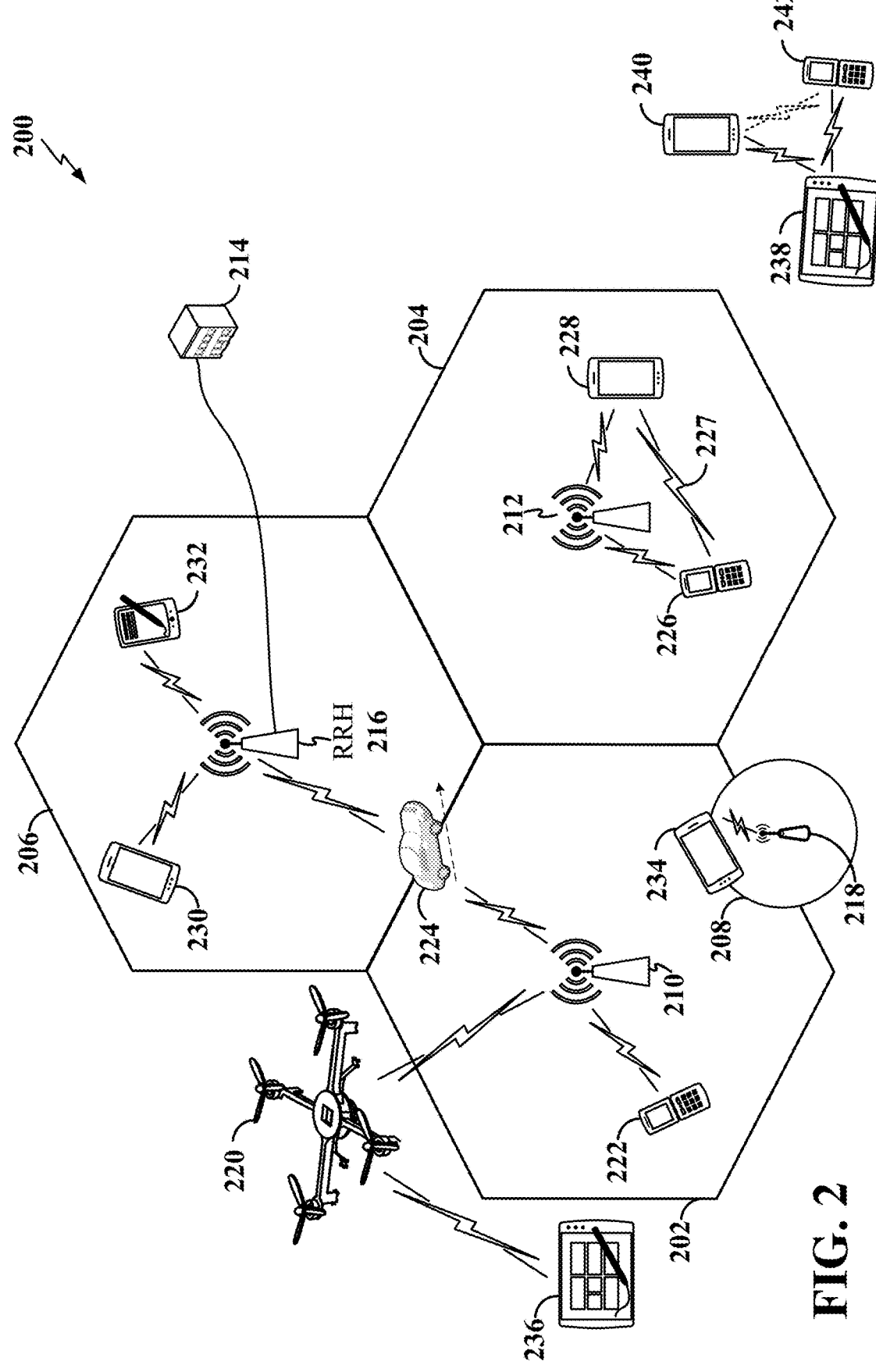
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time—frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancelation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
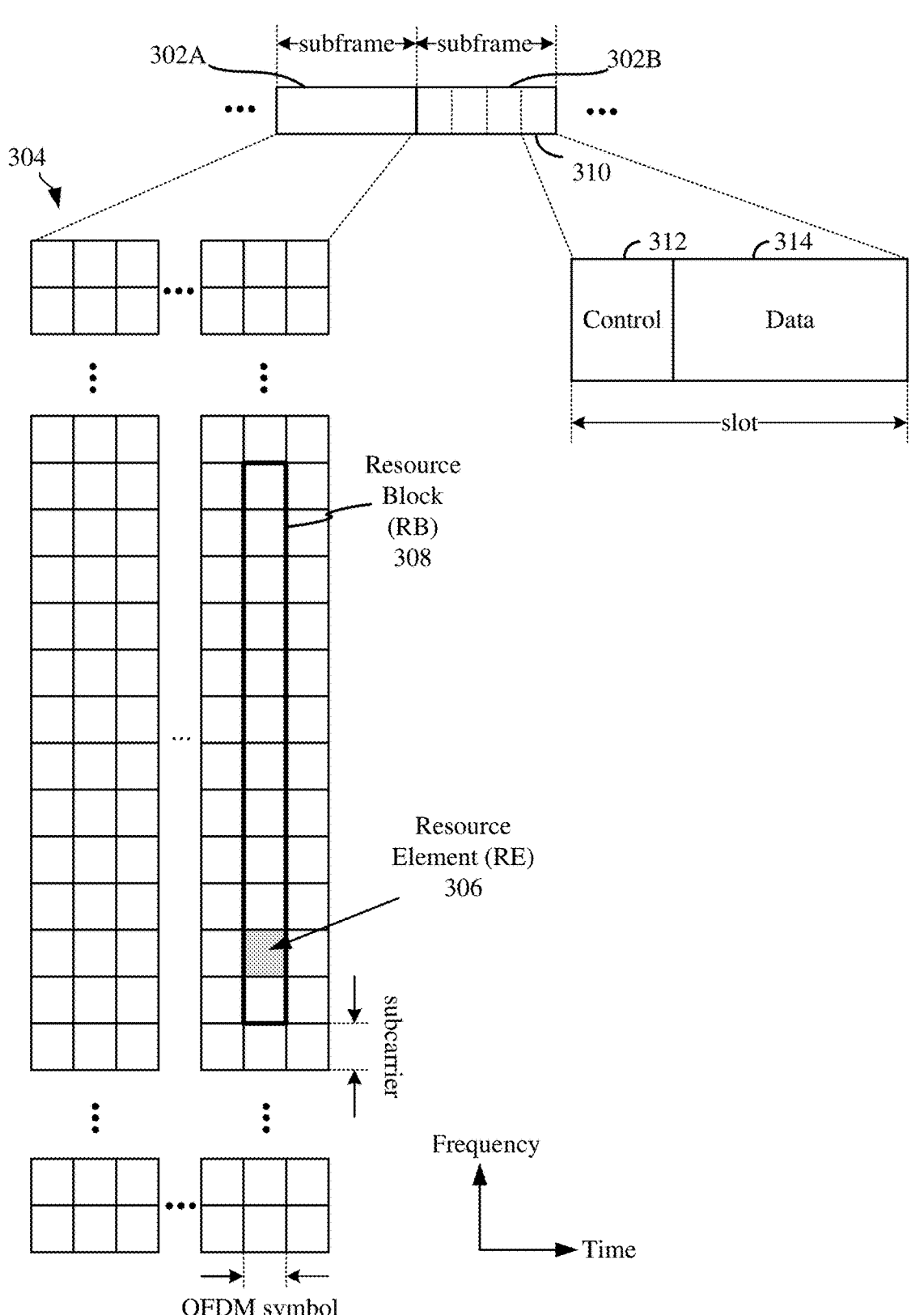
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more bandwidth parts (BWPs), where each BWP includes two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information—reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

As mentioned above, a base station may send an UL grant or a DL grant to a

UE. An UL grant may specify, for example, which resource blocks and/or which modulation and coding scheme (MCS) the BS has allocated to the UE for an UL transmission. A DL grant may specify, for example, which resource blocks and/or which MCS the BS will use for a DL transmission. Different types of grants may be used in different examples. For a dynamic grant, a base station may send a DCI to a UE to schedule an individual transmission or reception (e.g., on PDSCH or PUSCH). For example, after a UE requests uplink resources, a base station may send a first DCI to schedule a first PUSCH transmission by the UE. Then, after a UE requests additional uplink resources, the base station may send a second DCI to schedule a second PUSCH transmission, and so on. For a configured grant (also referred to as a grant-free scheduling), a base station may configure uplink resources without having received a request for uplink resources from a UE. For example, the base station may send a DCI or a radio resource control (RRC) message to indicate that certain uplink resources have been pre-configured. In some implementations, a base station may send a DCI or an RRC message to activate or deactivate a configured grant.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH, or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the MCS and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As discussed above, wireless communication may be conducted over unlicensed radio frequency (RF) spectrum (e.g., an unlicensed RF band) or shared RF spectrum in some scenarios. For example, a network operator may deploy cells that are configured to communicate on an unlicensed RF spectrum (e.g., in addition to cells operating on a licensed RF spectrum) to extend the coverage of the network or to provide additional services (e.g., higher throughput) to UEs operating within the network. As another example, a UE may be configured to communicate with another device (e.g., a BS or another UE) on an unlicensed RF spectrum.

In some scenarios, devices that transmit over an unlicensed RF spectrum may use a collision avoidance scheme to reduce the likelihood that multiple devices will transmit on the same RF spectrum at the same time. One example of such a collision avoidance scheme is a listen-before-talk (LBT) procedure. In general, before a first device transmits on a particular RF spectrum, the first device may listen for any transmissions by any other devices on that RF spectrum. If the RF spectrum is currently being used, the first device may back-off for a period of time and then re-attempt transmission (e.g., by listening for other transmissions again). Carrier sense multiple access (CSMA) is one example of an LBT procedure. Other types of LBT procedures may be used as well.

NR operation in the unlicensed RF spectrum may be referred to as NR-U. Under NR-U, some transmissions may be subject to LBT. For example, a wireless device, such as a UE or a gNB, may perform a clear channel assessment (CCA), such as LBT, prior to gaining control of a wireless channel in an unlicensed RF spectrum. A gNB may transmit, subject to LBT, a synchronization signal block (SSB) that carries synchronization signals and reference signals (e.g., discovery reference signals (DRSs)) for a UE to discover and synchronize with the gNB.

Different types of LBT procedures may be defined according to different categories. For example, Category 1 (Cat. 1) LBT specifies that LBT is not used. Cat. 2 LBT specifies the use of BTW without random back-off. Cat. 3 LBT specifies the use of LBT with random back-off with a fixed size contention window. Cat. 4 LBT specifies the use of LBT with random back-off with a variable sized contention window.

A gNB may schedule uplink transmissions for UEs, specifying which time-domain and frequency-domain resources each UE is to use for its respective uplink transmission. For UL transmissions on an unlicensed RF spectrum, interlaced-based scheduling may be used in the frequency domain For example, in NR-U, a PRB interlaced waveform may be used in the UL to satisfy occupied channel bandwidth (OCB) goals and/or to boost UL transmit power for a given power spectral density (PSD) limitation.

A gNB may schedule a UE to transmit according to one of more of the interlaces. For example, a gNB may schedule a first UE to transmit on interlace 0 and schedule a second UE to transmit on interlace 1. As another example, a gNB may schedule a first UE to transmit on interlace 0 and interlace 1. Other examples are possible.

After a successful LBT procedure (e.g., indicating that a channel is free to use), a gNB may reserve the channel for a period of time. This period of time may be referred to as a channel occupancy time (COT). In some examples, a gNB may reserve a COT for an UL transmission by a UE.

A UE may conduct an LBT procedure to determine whether it can transmit during a COT. In some aspects, an LBT procedure may involve sensing energy on the channel and comparing the energy to an energy detection (ED) threshold. For example, if the detected energy on the channel is at or below the ED threshold level (e.g., indicating that the channel is relatively free of traffic), the UE may elect to transmit on the channel during the COB. Conventionally, a gNB may configure the UE with an ED threshold. For example, the gNB may determine this ED threshold based on the UE's transmit power (e.g., in an attempt to ensure that the UE's transmissions during the COT will not unduly interfere with any overlapping use of the channel by another device).

In some examples, a UE may share its COT with another device. For example, a UE may allow a BS to transmit during a portion of a COT.

In UL to DL COT sharing in NR-U, a gNB may acquire a COT for an UL transmission by a UE (e.g., in response to a request for UL resources from a UE). In addition, sharing of a UE-initiated channel occupancy (e.g., a configured grant-PUSCH (CG-PUSCH) or a scheduled UL) with a gNB may be supported. For example, a UE may transmit during a first portion (e.g., one or more UL slots) of the COT and, following a gap period, the gNB may transmit during a remaining portion (e.g., one or more DL slots) of the COT. In some aspects, COT sharing between a gNB and UE in NR-U may provide improved medium access within the COT.

In some examples, the gNB is allowed to transmit (e.g., control signals, control channels, broadcast signals, broadcast channels, etc.) during the COT to any UEs as long as the transmission contains a transmission for the UE that initiated the COT. In some examples, the gNB is allowed to transmit DL signals and/or channels (e.g., PDSCH, PDCCH, reference signals, etc.) meant for the UE that initiated the COT.

A UE may use an energy detect (ED) threshold when initiating a channel occupancy. For example, if the energy detected on a channel during the LBT procedure is less than or equal to the ED threshold, the UE may transmit during the COT.

The ED threshold that the UE applies when initiating a channel occupancy to be shared with the gNB may be configured by the gNB (e.g., via RRC signaling). For example, a gNB may select the ED threshold value based on the transmit power of the gNB (e.g., in an attempt to ensure that the gNB's transmissions during the shared COT will not unduly interfere with any overlapping use of the channel by another device).

In some scenarios, the ED threshold that the UE applies when initiating a channel occupancy to be shared with the gNB is not configured by the gNB. In this case, the transmission of the gNB in the UE initiated COT may be restricted to include only control and/or broadcast transmissions of up to 2, 4, or 8 OFDM symbols in duration for a 15, 30, or 60 kHz sub-carrier spacing (SCS), respectively.

In some scenarios, the absence of Wi-Fi signaling on the unlicensed RF spectrum cannot be assumed (e.g., based on regulation). In this case, the ED threshold that the gNB configures the UE to apply when initiating the channel occupancy may be determined based on the maximum gNB transmit (TX) power.

Figure 4:
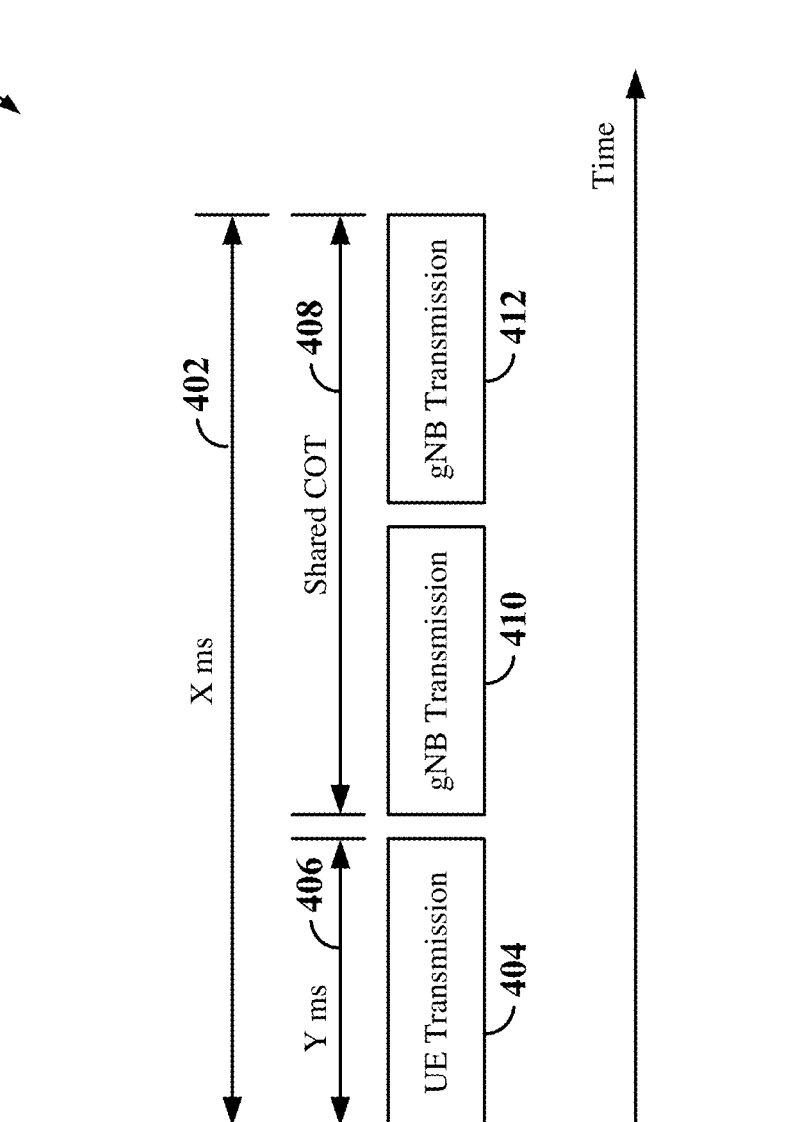
FIG. 4 is a conceptual illustration of an example of a channel occupancy time according to some aspects.

FIG. 4 illustrates an example of COT sharing 400 in the time domain (e.g., TDM COT sharing). Here, a gNB has reserved a COT 402 with a duration of X milliseconds (ms) for uplink transmission by a UE. The UE transmits information 404 during a first period of time 406 with a duration of Y ms. The UE allows the gNB to transmit during a shared COT 408. In this example, the gNB transmits first information 410 during a first portion (e.g., one or more slots) of the shared COT 408 and second information 412 during a second portion (e.g., one or more slots) of the shared COT 408.

When an ED threshold is configured, a UE may send an uplink control information (UCI) indication regarding the COT sharing to a gNB. In some examples, the UCI indication includes a row index into an RRC-configured table. This table may include information for cell association and power control (CAPC) and the parameters D and O discussed below. This information may be jointly encoded. The parameter D specifies the number of slots where DL transmissions can be assumed within a UE-initiated COT. The parameter O specifies the DL offset that represents the starting slot of the DL transmission indicated as the number of slots from the end of the slot (of the UCI indication), if the indicated D>0. Another row of the UCI indication may specify that COT sharing is not allowed.

If the ED threshold is not configured by the gNB (e.g., as discussed above), the UE may send a one-bit COT sharing indication to the gNB. This bit may indicate whether the slot/symbol n+X is an applicable slot for UL to DL sharing. Here, the parameter X is configured by the gNB as part of the RRC configuration. The parameter X is the number of symbols from the end of the slot (n) where the COT sharing indication is enabled.

In some scenarios, when a COT sharing ED threshold is configured, the UE may always use the configured ED threshold for LBT and the COT may always be shared with the gNB. This approach may have one or more drawbacks. For example, the channel access probability for the UE may be reduced since the configure COT sharing ED threshold is more sensitive (e.g., a higher value) than the non-COT sharing ED threshold value (e.g., calculated based on the lower UE transmission power as discussed above). Also, if the gNB does not have any DL data to send after the end of the UE's UL transmission during the COT, there is no need for the UE to share its COT with the gNB. Furthermore, in some scenarios, (e.g., for a dynamic grant-PUSCH (DG-PUSCH), there is no mechanism for a UE to select a different ED threshold when a COT sharing ED threshold is configured.

The disclosure relates in some aspects to techniques for enabling a UE to select an ED threshold for a COT (e.g., select an ED threshold that the UE uses to determine whether the UE can transmit during the COT). In some examples, a UE may select an ED threshold based on the priority of uplink traffic scheduled during the COT. This technique is described in more detail below in conjunction with FIG. 5. In some examples, a UE may select an ED threshold based on the type of grant that scheduled the uplink traffic during the COT. This technique is described in more detail below in conjunction with FIG. 6.

Figure 5:
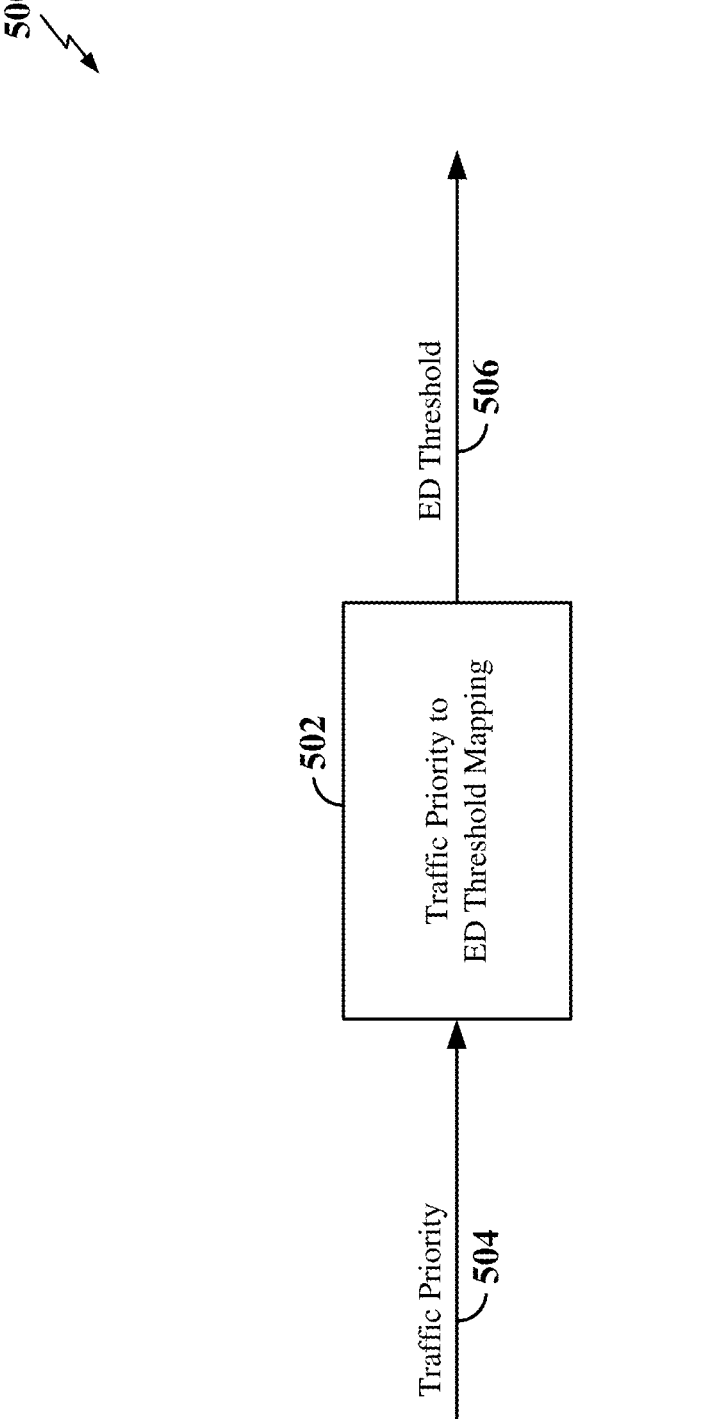
FIG. 5 is a conceptual illustration of an example of energy detection (ED) threshold selection according to some aspects.

FIG. 5 illustrates an example of a technique 500 for selecting an ED threshold based on the priority of uplink traffic. Here, a mapping 502 may map different traffic priorities to different ED thresholds. For example, the mapping 502 may specify that a particular priority 504 maps to a particular ED threshold 506. The mapping 502 may be hard coded into the UE (e.g., when the UE is first configured to operate in a particular network) or the network may send the mapping 502 to the UE.

A gNB may send an indication of a priority associated with uplink traffic that is scheduled for transmission during a COT. For example, a DCI (e.g., DCI 0_1 or DCI 0_2) may include a field for a priority indicator. This field may assign a priority to a dynamically granted PUSCH/asynchronous-CSI (A-CSI), or some other type of granted UL resource. Thus, in some examples, the UE may determine the priority of the uplink traffic from a corresponding field in the UL-grant (e.g., DCI 0_1 or DCI 0_2) that schedules the PUSCH.

In view of the above, a UE may determine the ED threshold value that is associated with prioritized uplink traffic (e.g., a DG-PUSCH). This association (mapping) may be hard coded or configurable.

In a first example (Option 1.1), the association between the ED threshold and the uplink traffic priority is hard coded into the UE. For example, the UE may be configured to use a higher ED threshold for higher priority traffic and to use a lower ED threshold for lower priority traffic.

In some aspects, this technique may enable a UE to improve that likelihood that the UE will be able to transmit higher priority PUSCH traffic (e.g., since the ED threshold is higher). This may come at the cost of not allowing COT sharing for the DL, however. For example, since the UE is using a higher threshold to determine whether to use the channel, the gNB may refrain from transmitting during the COT (e.g., since the higher threshold might not properly account for the higher transmit power that the gNB may use to transmit during the COT). Consequently, the gNB may refrain from sharing the COT whenever the gNB schedules higher priority traffic (or the gNB performs other scheduling that results in the UE selecting a higher ED threshold).

In a second example (Option 1.2), the gNB sends an RRC message that specifies (e.g., configures) the association between an ED threshold and a priority. Several examples of associations that may be specified by the RRC message follow.

In some examples, the RRC message specifies that a higher ED threshold (e.g., an ED threshold that results in no COT-sharing) is used for both high priority PUSCH traffic and low priority PUSCH traffic. For example, if the PUSCH traffic of a UE is more important than the DL traffic of a gNB, the gNB may specify (e.g., via the RRC message) that the UE is to use a higher ED threshold for both high priority traffic and low priority traffic. In some aspects, this may enable the UE to more easily transmit its UL traffic (e.g., due to the use of the higher ED threshold).

In some examples, the RRC message specifies that a lower ED threshold (e.g., an ED threshold that results in COT-sharing) is used for both high priority PUSCH traffic and low priority PUSCH traffic. For example, if the PUSCH traffic of a UE is less important than the DL traffic of a gNB, the gNB may specify (e.g., via the RRC message) that the UE is to use a lower ED threshold for both high priority traffic and low priority traffic. In some aspects, this may enable the gNB to more easily transmit its DL traffic (e.g., since COT sharing may be enabled due to the use of the lower ED threshold).

In some examples, the RRC message specifies that a higher ED threshold (e.g., an ED threshold that results in no COT-sharing) is used for high priority PUSCH traffic and a lower ED threshold (e.g., an ED threshold that results in COT-sharing) is used for low priority PUSCH traffic. In some aspects, this may enable a gNB to prioritize the higher priority uplink traffic for channel access, and prioritize UL to DL COT sharing for lower priority uplink traffic.

In a third example (Option 1.3), the gNB sends an RRC message that specifies (e.g., configures) which one of several possible combinations of priorities to ED thresholds is to be used. Table 1 set forth below illustrates an example of four combinations that may be indicated by such an RRC message.

TABLE 1

| Index | High Priority PUSCH | Low Priority PUSCH |
|-------|---------------------|--------------------|
| 0 | Low ED threshold | Low ED threshold |
| 1 | Low ED threshold | High ED threshold |
| 2 | High ED threshold | Low ED threshold |
| 3 | High ED threshold | High ED threshold |

The mapping of Table 1 may be hard coded into a UE or sent to the UE (e.g., via an RRC message). Once the UE is configured with Table 1, the gNB may send an RRC message that includes an index value (e.g., 0, 1, 2, or 3) to specify which ED threshold the UE is to use for different types of prioritized PUSCH traffic. For example, if the UE receives index 0, the UE will use the low ED threshold for high priority PUSCH traffic and for low priority PUSCH traffic. If, on the other hand, the UE receives index 2, the UE will use the high ED threshold for high priority PUSCH traffic and the low ED threshold for low priority PUSCH traffic.

The techniques described above for selecting an ED threshold based on the priority of uplink traffic may be applicable to different types of grants. For example, for a CG-PUSCH, the CG-PUSCH can be configured with high priority traffic or low priority traffic. A gNB may indicate the priority of the CG-PUSCH in an RRC message (e.g., an RRC configuration).

The techniques describe above for selecting an ED threshold based on the priority of uplink traffic may be applicable to multiple types of grants. In some examples, a common ED threshold control mechanism may be used for DG-PUSCH traffic and CG-PUSCH traffic. For example, the same mapping between a particular priority and a particular ED threshold may be used for both DG-PUSCH traffic and CG-PUSCH traffic. In some examples, different ED threshold control may be used for DG-PUSCH traffic and CG-PUSCH traffic. For example, one mapping between a particular priority and a particular ED threshold may be used for DG-PUSCH traffic and a different mapping between a particular priority and a particular ED threshold may be used for CG-PUSCH traffic.

Figure 6:
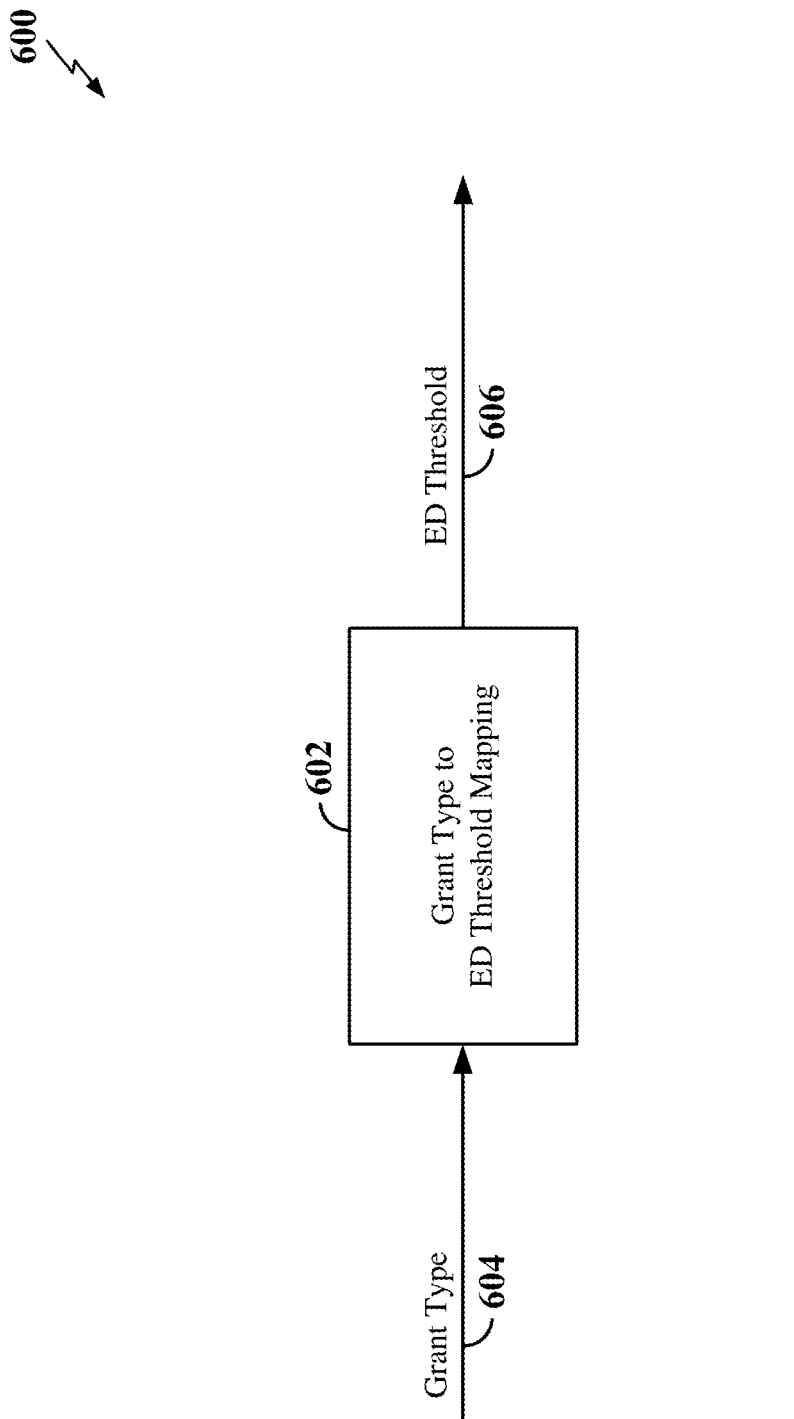
FIG. 6 is a conceptual illustration of another example of ED threshold selection according to some aspects.

FIG. 6 illustrates an example of a technique 600 for selecting an ED threshold based on the type of grant that scheduled the uplink traffic. Here, a mapping 602 may map different grant types to different ED thresholds. For example, the mapping 602 may specify that a particular grant type 604 maps to a particular ED threshold 606. The mapping 602 may be hard coded into the UE (e.g., when the UE is first configured to operate in a particular network) or the network may send the mapping 602 to the UE.

Thus, in some examples, a gNB may use different ED thresholds depending on whether uplink traffic was scheduled by a CG or a DG. For example, the gNB may configure a UE to share a COT with the gNB if the uplink traffic is scheduled by a CG, but not share the COT if the uplink traffic is scheduled by a DG.

In view of the above, a UE may determine the ED threshold value that is associated with a particular type of grant. This association (mapping) may be hard coded or configurable.

In a first example (Option 2.1), the association between the ED threshold and the grant type is hard coded into the UE. For example, the UE may be configured to use a higher ED threshold for uplink traffic scheduled by a DG and to use a lower ED threshold for uplink traffic scheduled by a CG.

In some aspects, this technique may enable a UE to improve that likelihood that the UE will be able to transmit DG-PUSCH traffic (e.g., since the ED threshold is higher). This may come at the cost of not allowing COT sharing for the DL, however. For example, since the UE is using a higher threshold to determine whether to use the channel, the gNB may refrain from transmitting during the COT (e.g., since the higher threshold might not properly account for the higher transmit power that the gNB may use to transmit during the COT). Consequently, the gNB may refrain from sharing the COT whenever the gNB schedules DG-PUSCH traffic (or the gNB performs other scheduling that results in the UE selecting a higher ED threshold).

In a second example (Option 2.2), the gNB sends an RRC message that specifies (e.g., configures) the association between an ED threshold and a grant type. Several examples of associations that may be specified by the RRC message follow.

In some examples, the RRC message specifies that a higher ED threshold (e.g., an ED threshold that results in no COT-sharing) is used for both uplink traffic scheduled by a DG and uplink traffic scheduled by a CG. For example, if the PUSCH traffic of a UE is more important than the DL traffic of a gNB, the gNB may specify (e.g., via the RRC message) that the UE is to use a higher ED threshold for both DG-PUSCH traffic and CG-PUSCH traffic. In some aspects, this may enable the UE to more easily transmit its UL traffic (e.g., due to the use of the higher ED threshold).

In some examples, the RRC message specifies that a lower ED threshold (e.g., an ED threshold that results in COT-sharing) is used for both uplink traffic scheduled by a DG and uplink traffic scheduled by a CG. For example, if the PUSCH traffic of a UE is less important than the DL traffic of a gNB, the gNB may specify (e.g., via the RRC message) that the UE is to use a lower ED threshold for both DG-PUSCH traffic and CG-PUSCH traffic. In some aspects, this may enable the gNB to more easily transmit its DL traffic (e.g., since COT sharing may be enabled due to the use of the lower ED threshold).

In some examples, the RRC message specifies that a higher ED threshold (e.g., an ED threshold that results in no COT-sharing) is used for uplink traffic scheduled by a DG and a lower ED threshold (e.g., an ED threshold that results in COT-sharing) is used for uplink traffic scheduled by a CG. In some aspects, this may enable a gNB to prioritize DG-PUSCH traffic for channel access, and prioritize UL to DL COT sharing for CG-PUSCH traffic.

In a third example (Option 2.3), the gNB sends an RRC message that specifies (e.g., configures) which one of several possible combinations of grant types to ED thresholds is to be used. Table 2 set forth below illustrates an example of four combinations that may be indicated by such an RRC message.

TABLE 2

| Index | CG PUSCH | DG PUSCH |
|-------|----------|----------|
| 0 | Low ED threshold | Low ED threshold |
| 1 | Low ED threshold | High ED threshold |
| 2 | High ED threshold | Low ED threshold |
| 3 | High ED threshold | High ED threshold |

The mapping of Table 1 may be hard coded into a UE or sent to the UE (e.g., via an RRC message). Once the UE is configured with Table 1, the gNB may send an RRC message that includes an index value (e.g., 0, 1, 2, or 3) to specify which ED threshold the UE is to use for different types of grants. For example, if the UE receives index 0, the UE will use the low ED threshold for DG-PUSCH traffic and for CG-PUSCH traffic. If, on the other hand, the UE receives index 2, the UE will use the high ED threshold for CG-PUSCH traffic and the low ED threshold for DG-PUSCH traffic.

FIG. 7 is a diagram illustrating an example of signaling 700 associated with selection of an ED threshold in a wireless communication network including a UE 702 and a BS 704. In some examples, the UE 702 may correspond to one or more of the scheduled entity 106 (e.g., a UE, etc.) of FIG. 1, or the UE 222, 224, 226, 228, 230, 232, 234, 238, 240, or 242 of FIG. 2. In some examples, the BS 704 may correspond to one or more of the scheduling entity 108 of FIG. 1, or the base station 210, 212, 214, or 216 of FIG. 2.

At optional step 706 of FIG. 7, the BS 704 may configure the UE 702 with an ED threshold to be used when the UE 702 shares a COT with the BS 704.

At step 708, the BS 704 schedules an UL transmission for the UE 702 during a COT and sends a corresponding grant to the UE 702. The grant may include an indication of the priority of the UL traffic (e.g., as discussed herein).

At optional step 710, the BS 704 may send a RRC message to the UE 702, where the RRC message includes an ED threshold configuration (e.g., ED threshold mapping information as discussed herein for Option 1.2 or 1.3). Step 710 may be omitted in scenarios where the UE 702 is pre-configured (e.g., hard coded) with ED threshold mapping information (e.g., as discussed herein for Option 1.1).

At step 712, the UE 702 selects an ED threshold based on the priority of the uplink traffic. In some examples (e.g., Option 1.1), the UE 702 uses pre-configured (e.g., hard coded) ED threshold mapping information to select the ED threshold. In some examples (e.g., Option 1.2 or 1.3), the UE 702 uses ED threshold mapping information from the RRC message of step 710 to select the ED threshold.

to the use of the lower ED threshold).

At step 714, the UE 702 performs an LBT procedure to determine whether the UE 702 can transmit on the channel during the COT. This LBT procedure uses the ED threshold selected at step 712.

At step 716, the UE 702 transmits its uplink traffic on the channel during the COT if the LBT procedure of step 714 indicates that the channel is available (e.g., the energy detected on the channel was less than or equal to the ED threshold selected at step 712).

FIG. 8 is a diagram illustrating an example of signaling 800 associated with selection of an ED threshold in a wireless communication network including a UE 802 and a BS 804. In some examples, the UE 802 may correspond to one or more of the scheduled entity 106 (e.g., a UE, etc.) of FIG. 1, or the UE 222, 224, 226, 228, 230, 232, 234, 238, 240, or 242 of FIG. 2. In some examples, the BS 804 may correspond to one or more of the scheduling entity 108 of FIG. 1, or the base station 210, 212, 214, or 216 of FIG. 2.

At optional step 806 of FIG. 8, the BS 804 may configure the UE 802 with an ED threshold to be used when the UE 802 shares a COT with the BS 804.

At step 808, the BS 804 schedules an UL transmission for the UE 802 during a COT and sends a corresponding grant to the UE 802. The grant may be a DG, a CG, or some other type of grant.

At optional step 810, the BS 804 may send a RRC message to the UE 802, where the RRC message includes an ED threshold configuration (e.g., ED threshold mapping information as discussed herein for Option 2.2 or 2.3). Step 810 may be omitted in scenarios where the UE 802 is pre-configured (e.g., hard coded) with ED threshold mapping information (e.g., as discussed herein for Option 2.1).

At step 812, the UE 802 selects an ED threshold based on the grant type. In some examples (e.g., Option 2.1), the UE 802 uses pre-configured (e.g., hard coded) ED threshold mapping information to select the ED threshold. In some examples (e.g., Option 2.2 or 2.3), the UE 802 uses ED threshold mapping information from the RRC message of step 810 to select the ED threshold.

At step 814, the UE 802 performs an LBT procedure to determine whether the UE 802 can transmit on the channel during the COT. This LBT procedure uses the ED threshold selected at step 812.

At step 816, the UE 802 transmits its uplink traffic on the channel during the COT if the LBT procedure of step 814 indicates that the channel is available (e.g., the energy detected on the channel was less than or equal to the ED threshold selected at step 812).

Figure 9:
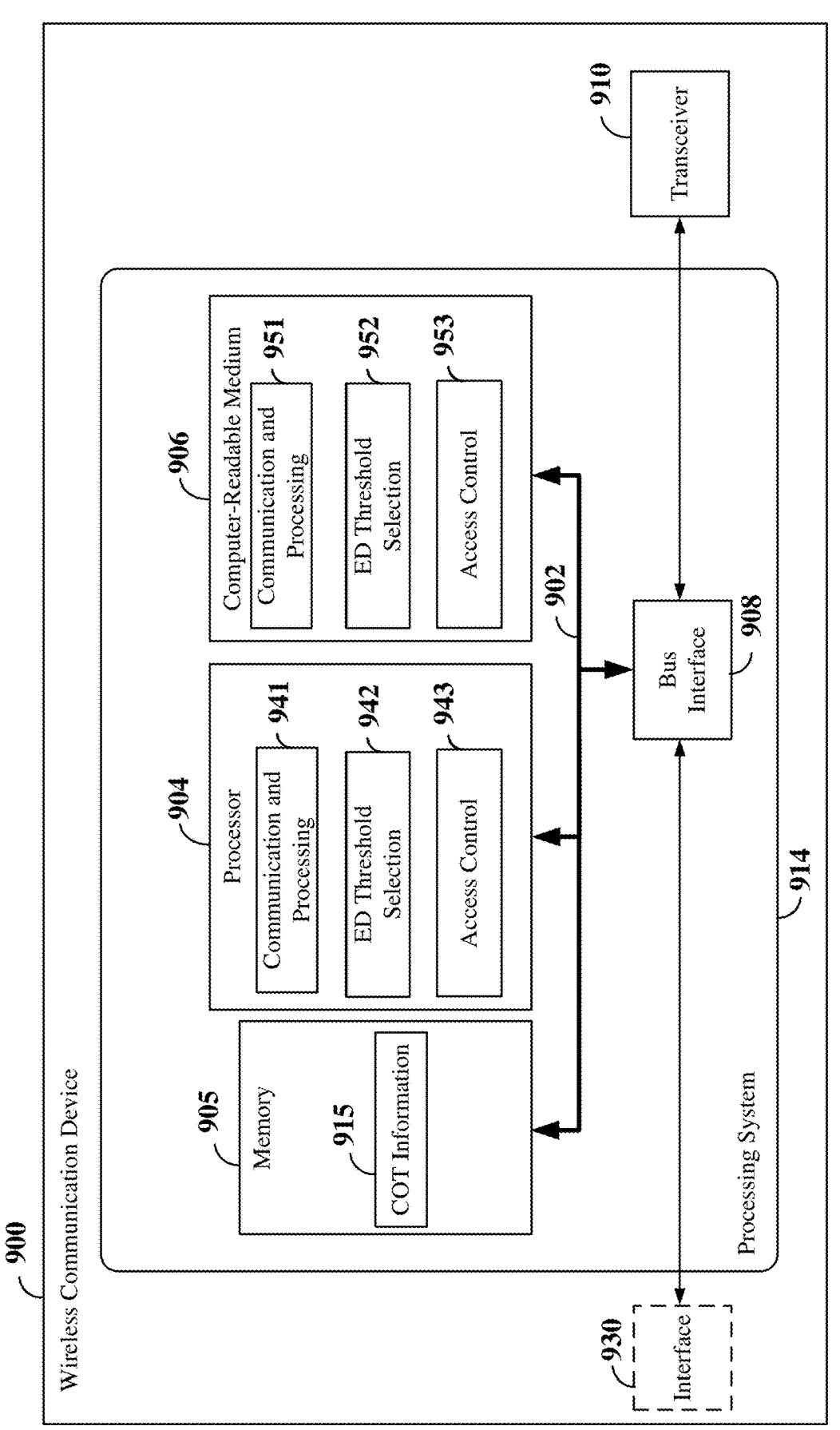
FIG. 9 is a block diagram conceptually illustrating an example of a hardware implementation for a communication device employing a processing system according to some aspects.

FIG. 9 is a diagram illustrating an example of a hardware implementation for a wireless communication device 900 employing a processing system 914. For example, the wireless communication device 900 may be a user equipment (UE) or other device configured to wirelessly communicate with a base station, as discussed in any one or more of FIGS. 1-8. In accordance with various aspects of the disclosure, an element, or any portion of an element, or any combination of elements may be implemented with a processing system 914 that includes one or more processors 904. In some implementations, the wireless communication device 900 may correspond to one or more of the scheduled entity 106 (e.g., a UE, etc.) of FIG. 1, the UE 222, 224, 226, 228, 230, 232, 234, 238, 240, or 242 of FIG. 2, the UE 702 of FIG. 7, or the UE 802 of FIG. 8.

The wireless communication device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 900 may be configured to perform any one or more of the functions described herein. That is, the processor 904, as utilized in a wireless communication device 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910 and between the bus 902 and an interface 930. The transceiver 910 provides a communication interface or means for communicating with various other apparatus over a wireless transmission medium. In some examples, the wireless communication device may include two or more transceivers 910, each configured to communicate with a respective network type (e.g., terrestrial or non-terrestrial). The interface 930 provides a communication interface or means of communicating with various other apparatuses and devices (e.g., other devices housed within the same apparatus as the wireless communication device or other external apparatuses) over an internal bus or external transmission medium, such as an Ethernet cable. Depending upon the nature of the apparatus, the interface 930 may include a user interface (e.g., keypad, display, speaker, microphone, joystick). Of course, such a user interface is optional, and may be omitted in some examples, such as an IoT device.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 900 may be configured to perform any one or more of the operations described herein (e.g., as described above in conjunction with FIGS. 1-8 and as described below in conjunction with FIGS. 10-13). In some aspects of the disclosure, the processor 904, as utilized in the wireless communication device 900, may include circuitry configured for various functions.

The processor 904 may include communication and processing circuitry 941. The communication and processing circuitry 941 may include one or more hardware components that provide the physical structure that performs various processes related to wireless communication (e.g., signal reception and/or signal transmission) as described herein. The communication and processing circuitry 941 may further include one or more hardware components that provide the physical structure that performs various processes related to signal processing (e.g., processing a received signal and/or processing a signal for transmission) as described herein. In some examples, the communication and processing circuitry 941 may include two or more transmit/receive chains, each configured to process signals in a different RAT (or RAN) type. The communication and processing circuitry 941 may further be configured to execute communication and processing software 951 included on the computer-readable medium 906 to implement one or more functions described herein.

In some implementations where the communication involves receiving information, the communication and processing circuitry 941 may obtain information from a component of the wireless communication device 900 (e.g., from the transceiver 910 that receives the information via radio frequency signaling or some other type of signaling suitable for the applicable communication medium), process (e.g., decode) the information, and output the processed information. For example, the communication and processing circuitry 941 may output the information to another component of the processor 904, to the memory 905, or to the bus interface 908. In some examples, the communication and processing circuitry 941 may receive one or more of signals, messages, other information, or any combination thereof. In some examples, the communication and processing circuitry 941 may receive information via one or more channels. In some examples, the communication and processing circuitry 941 may include functionality for a means for receiving.

In some implementations where the communication involves sending (e.g., transmitting) information, the communication and processing circuitry 941 may obtain information (e.g., from another component of the processor 904, the memory 905, or the bus interface 908), process (e.g., encode) the information, and output the processed information. For example, the communication and processing circuitry 941 may output the information to the transceiver 910 (e.g., that transmits the information via radio frequency signaling or some other type of signaling suitable for the applicable communication medium). In some examples, the communication and processing circuitry 941 may send one or more of signals, messages, other information, or any combination thereof. In some examples, the communication and processing circuitry 941 may send information via one or more channels. In some examples, the communication and processing circuitry 941 may include functionality for a means for sending (e.g., a means for transmitting).

The processor 904 may include ED threshold selection circuitry 942 configured to perform ED threshold selection-related operations as discussed herein. The ED threshold selection circuitry 942 may include functionality for a means for selecting an energy detection threshold. The ED threshold selection circuitry 942 may further be configured to execute ED threshold selection software 952 included on the computer-readable medium 906 to implement one or more functions described herein.

The processor 904 may include access control circuitry 943 configured to perform access control-related operations as discussed herein. The access control circuitry 943 may include functionality for a means for measuring energy on a channel (e.g., by performing an LBT procedure). The access control circuitry 943 may include functionality for a means for determining whether the energy is less than or equal to an ED threshold (e.g., by performing an LBT procedure). The access control circuitry 943 may include functionality for a means for selectively transmitting on a channel (e.g., transmitting on the channel if an LBT procedure indicated that the channel was available or not transmitting on the channel if an LBT procedure indicated that the channel was busy). The access control circuitry 943 may further be configured to execute access control software 953 included on the computer-readable medium 906 to implement one or more functions described herein.

Figure 10:
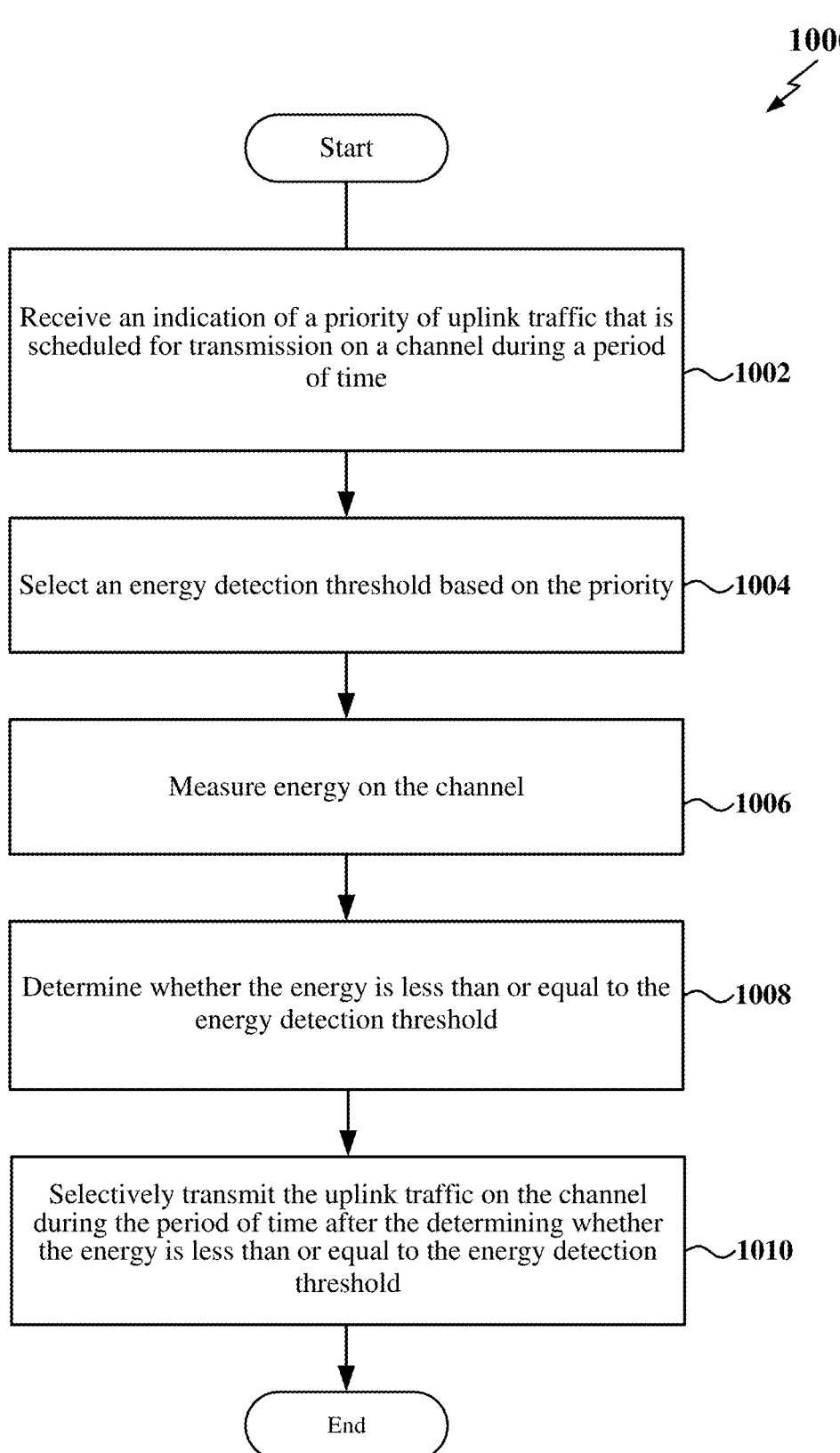
FIG. 10 is a flow chart illustrating an example wireless communication process for ED threshold selection according to some aspects.

FIG. 10 is a flow chart illustrating an example process 1000 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the wireless communication device 900 illustrated in FIG. 9. In some aspects, the wireless communication device may be a user equipment. In some examples, the process 1000 may be carried out by any suitable apparatus or means for carrying out the functions or algorithm described below.

At block 1002, a wireless communication device may receive an indication of a priority of uplink traffic that is scheduled for transmission on a channel during a period of time. For example, the ED threshold selection circuitry 942 in cooperation with the communication and processing circuitry 941 and the transceiver 910, shown and described above in connection with FIG. 9, may receive an grant that includes the indication from a BS.

In some examples, the channel may include (e.g., may be) a shared channel. In some examples, the period of time may include (e.g., may be) a channel occupancy time.

In some examples, receiving the indication may include receiving the indication in downlink control information from a base station. In some examples, receiving the indication may include receiving a dynamic grant that includes the indication from a base station. In some examples, receiving the indication may include receiving a configured grant that includes the indication from a base station.

At block 1004, the wireless communication device may select an energy detection threshold based on the priority. For example, the ED threshold selection circuitry 942, shown and described above in connection with FIG. 9, may use Option 1.1 to select an ED threshold.

In some examples, selecting the energy detection threshold may include selecting the energy detection threshold from a defined mapping of a plurality of priorities and a plurality of energy detection thresholds. In this case, the plurality of priorities may include a first priority and a second priority different from the first priority, the plurality of energy detection thresholds may include a first energy detection threshold and a second energy detection threshold different from the first energy detection threshold, the first priority may be associated with the first energy detection threshold, and the second priority may be associated with the second energy detection threshold.

In some examples, selecting the energy detection threshold may include determining that the priority is a highest priority of a defined set of priorities and selecting a highest energy detection threshold of a defined set of energy detection thresholds responsive to determining that the priority is the highest priority of the defined set of priorities.

In some examples, the process may further include receiving a defined energy detection threshold from a base station. In this case, selecting the energy detection threshold may include selecting a threshold different from the defined energy detection threshold.

At block 1006, the wireless communication device may measure energy on the channel. For example, the access control circuitry 943, shown and described above in connection with FIG. 9, may perform an LBT procedure on the channel.

At block 1008, the wireless communication device may determine whether the energy is less than or equal to the energy detection threshold. For example, the access control circuitry 943, shown and described above in connection with FIG. 9, may compared a measured energy level to the ED threshold selected at block 1004.

At block 1010, the wireless communication device may selectively transmit the uplink traffic on the channel during the period of time after the determining whether the energy is less than or equal to the energy detection threshold. For example, the access control circuitry 943 in cooperation with the communication and processing circuitry 941 and the transceiver 910, shown and described above in connection with FIG. 9, may conduct a transmission during a COT if an LBT procedure indicated that the corresponding channel was available. Alternatively, the access control circuitry 943 in cooperation with the communication and processing circuitry 941 and the transceiver 910, shown and described above in connection with FIG. 9, may abstain from transmitting during a COT if an LBT procedure indicated that the corresponding channel was busy.

In some examples, selectively transmitting the uplink traffic on the channel during the period of time after the determining whether the energy is less than or equal to the energy detection threshold may include determining that the channel is available based on the determining of whether the energy is less than or equal to the energy detection threshold and commencing the transmitting of the uplink traffic on the channel during the period of time after determining that the channel is available.

In some examples, selectively transmitting the uplink traffic on the channel during the period of time after the determining whether the energy is less than or equal to the energy detection threshold may include determining that the channel is busy based on the determining of whether the energy is less than or equal to the energy detection threshold and refraining from the transmitting of the uplink traffic on the channel during the period of time after determining that the channel is busy.

FIG. 11 is a flow chart illustrating an example process 1100 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the wireless communication device 900 illustrated in FIG. 9. In some aspects, the wireless communication device may be a user equipment. In some examples, the process 1100 may be carried out by any suitable apparatus or means for carrying out the functions or algorithm described below.

At block 1102, a wireless communication device may receive a first indication of at least one energy detection threshold for prioritized traffic to use for energy detection on a channel during a period of time. For example, the ED threshold selection circuitry 942 in cooperation with the communication and processing circuitry 941 and the transceiver 910, shown and described above in connection with FIG. 9, may receive an RRC configuration that includes the indication from a BS.

In some examples, the channel may include (e.g., may be) a shared channel. In some examples, the period of time may include (e.g., may be) a channel occupancy time. In some examples, receiving the first indication may include receiving a radio resource control (RRC) configuration including the first indication from a base station.

In some examples, the at least one energy detection threshold is for dynamic grants and configured grants. In some examples, the at least one energy detection threshold is for dynamic grants or configured grants.

In some examples, the first indication may specify that a highest energy detection threshold of a set of energy detection thresholds is to be used for the energy detection on the channel during the period of time. In some examples, the first indication may specify that a lowest energy detection threshold of a set of energy detection thresholds is to be used for the energy detection on the channel during the period of time. In some examples, the first indication may specify that a highest energy detection threshold of a set of energy detection thresholds is to be used for the energy detection on the channel during the period of time for traffic designated as high priority traffic and for traffic designated as low priority traffic. In some examples, the first indication may specify that a lowest energy detection threshold of a set of energy detection thresholds is to be used for the energy detection on the channel during the period of time for traffic designated as high priority traffic and for traffic designated as low priority traffic.

At block 1104, the wireless communication device may select an energy detection threshold based on the first indication. For example, the ED threshold selection circuitry 942, shown and described above in connection with FIG. 9, may use Option 1.2 or 1.3 to select an ED threshold.

In some examples, the first indication may specify that a highest energy detection threshold of a set of energy detection thresholds is to be used for the energy detection on the channel during the period of time for traffic designated as low priority traffic and a lowest energy detection threshold of the set of energy detection thresholds is to be used for the energy detection on the channel during the period of time for traffic designated as high priority traffic. In some examples, the process may further include receiving a second indication of a priority of the uplink traffic. In this case, selecting the energy detection threshold based on the first indication may include selecting the energy detection threshold based on the first indication and the priority of the uplink traffic.

In some examples, the first indication may specify that a highest energy detection threshold of a set of energy detection thresholds is to be used for the energy detection on the channel during the period of time for traffic designated as high priority traffic and a lowest energy detection threshold of the set of energy detection thresholds is to be used for the energy detection on the channel during the period of time for traffic designated as low priority traffic. In some examples, the process may further include receiving a second indication of a priority of the uplink traffic. In this case, selecting the energy detection threshold based on the first indication may include selecting the energy detection threshold based on the first indication and the priority of the uplink traffic.

At block 1106, the wireless communication device may measure energy on the channel. For example, the access control circuitry 943, shown and described above in connection with FIG. 9, may perform an LBT procedure on the channel.

At block 1108, the wireless communication device may determine whether the energy is less than or equal to the energy detection threshold. For example, the access control circuitry 943, shown and described above in connection with FIG. 9, may compared a measured energy level to the ED threshold selected at block 1004.

At block 1110, the wireless communication device may selectively transmit the uplink traffic on the channel during the period of time after the determining whether the energy is less than or equal to the energy detection threshold. For example, the access control circuitry 943 in cooperation with the communication and processing circuitry 941 and the transceiver 910, shown and described above in connection with FIG. 9, may conduct a transmission during a COT if an LBT procedure indicated that the corresponding channel was available. Alternatively, the access control circuitry 943 in cooperation with the communication and processing circuitry 941 and the transceiver 910, shown and described above in connection with FIG. 9, may abstain from transmitting during a COT if an LBT procedure indicated that the corresponding channel was busy.

In some examples, selectively transmitting the uplink traffic on the channel during the period of time after the determining whether the energy is less than or equal to the energy detection threshold may include determining that the channel is available based on the determining of whether the energy is less than or equal to the energy detection threshold and commencing the transmitting of the uplink traffic on the channel during the period of time after determining that the channel is available.

In some examples, selectively transmitting the uplink traffic on the channel during the period of time after the determining whether the energy is less than or equal to the energy detection threshold may include determining that the channel is busy based on the determining of whether the energy is less than or equal to the energy detection threshold and refraining from the transmitting of the uplink traffic on the channel during the period of time after determining that the channel is busy.

In some examples, the first indication may include an index into a defined mapping of a plurality of priorities and a plurality of energy detection thresholds. In this case, the plurality of priorities may include a first priority and a second priority different from the first priority, the plurality of energy detection thresholds may include a first energy detection threshold and a second energy detection threshold different from the first energy detection threshold, the first priority is associated with the first energy detection threshold, and the second priority is associated with the second energy detection threshold. In some examples, the process may further include receiving the mapping from a base station. In some examples, the process may further include receiving a radio resource control (RRC) configuration including the mapping from a base station.

In some examples, the process may further include receiving a second indication of a priority of the uplink traffic. In this case, selecting the energy detection threshold based on the first indication may include selecting the energy detection threshold based on the index and the priority of the uplink traffic.

In some examples, the process may further include receiving a defined energy detection threshold from a base station.

In this case, selecting the energy detection threshold may include selecting a threshold different from the defined energy detection threshold.

Figure 12:
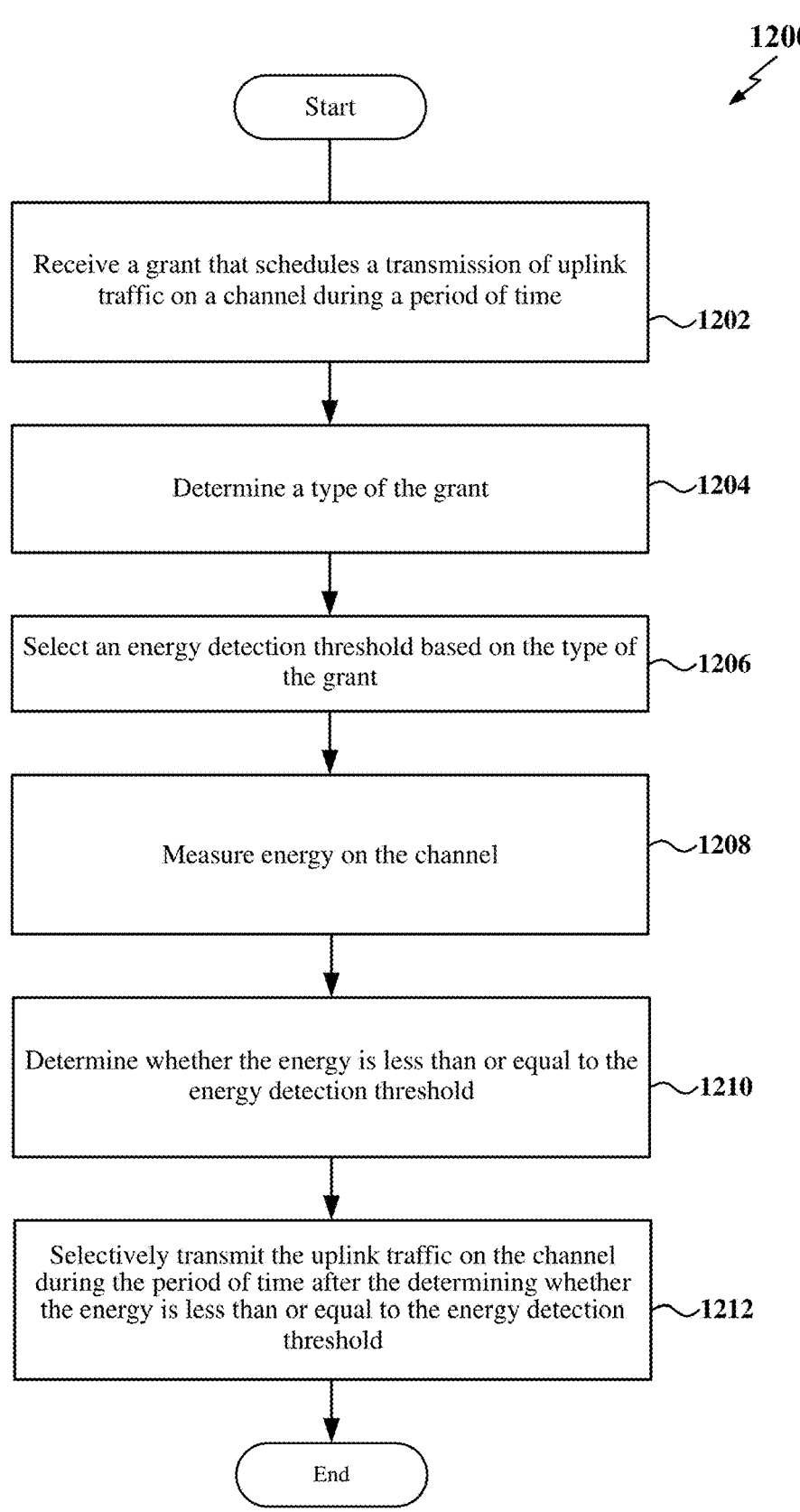
FIG. 12 is a flow chart illustrating another example wireless communication process for ED threshold selection according to some aspects.

FIG. 12 is a flow chart illustrating an example process 1200 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the wireless communication device 900 illustrated in FIG. 9. In some aspects, the wireless communication device may be a user equipment. In some examples, the process 1200 may be carried out by any suitable apparatus or means for carrying out the functions or algorithm described below.

At block 1202, a wireless communication device may receive a grant that schedules a transmission of uplink traffic on a channel during a period of time. For example, the communication and processing circuitry 941 and the transceiver 910, shown and described above in connection with FIG. 9, may receive an grant from a BS.

In some examples, the channel may include (e.g., may be) a shared channel. In some examples, the period of time may include (e.g., may be) a channel occupancy time.

At block 1204, the wireless communication device may determine a type of the grant. For example, the ED threshold selection circuitry 942, shown and described above in connection with FIG. 9, may determine whether the grant is a DG or a CG.

At block 1206, the wireless communication device may select an energy detection threshold based on the type of the grant. For example, the ED threshold selection circuitry 942, shown and described above in connection with FIG. 9, may use Option 2.1 to select an ED threshold.

In some examples, selecting the energy detection threshold may include selecting the energy detection threshold from a defined mapping of a plurality of grant types and a plurality of energy detection thresholds. In this case, the plurality of grant types may include a first grant type and a second grant type different from the first grant type, the plurality of energy detection thresholds may include a first energy detection threshold and a second energy detection threshold different from the first energy detection threshold, the first grant type is associated with the first energy detection threshold, and the second grant type is associated with the second energy detection threshold.

In some examples, selecting the energy detection threshold may include determining that the grant is a dynamic grant and selecting a highest energy detection threshold of a defined set of energy detection thresholds responsive to determining that the grant is a dynamic grant. In some examples, selecting the energy detection threshold may include determining that the grant is a configured grant and selecting a lowest energy detection threshold of a defined set of energy detection thresholds responsive to determining that the grant is a configured grant.

In some examples, selecting the energy detection threshold may include determining that the grant is a configured grant and selecting a highest energy detection threshold of a defined set of energy detection thresholds responsive to determining that the grant is a configured grant.

In some examples, selecting the energy detection threshold may include determining that the grant is a dynamic grant and selecting a lowest energy detection threshold of a defined set of energy detection thresholds responsive to determining that the grant is a dynamic grant.

In some examples, the process may further include receiving a defined energy detection threshold from a base station. In this case, selecting the energy detection threshold may include selecting a threshold different from the defined energy detection threshold.

At block 1208, the wireless communication device may measure energy on the channel. For example, the access control circuitry 943, shown and described above in connection with FIG. 9, may perform an LBT procedure on the channel.

At block 1210, the wireless communication device may determine whether the energy is less than or equal to the energy detection threshold. For example, the access control circuitry 943, shown and described above in connection with FIG. 9, may compared a measured energy level to the ED threshold selected at block 1004.

At block 1212, selectively transmit the uplink traffic on the channel during the period of time after the determining whether the energy is less than or equal to the energy detection threshold. For example, the access control circuitry 943 in cooperation with the communication and processing circuitry 941 and the transceiver 910, shown and described above in connection with FIG. 9, may conduct a transmission during a COT if an LBT procedure indicated that the corresponding channel was available. Alternatively, the access control circuitry 943 in cooperation with the communication and processing circuitry 941 and the transceiver 910, shown and described above in connection with FIG. 9, may abstain from transmitting during a COT if an LBT procedure indicated that the corresponding channel was busy.

In some examples, selectively transmitting the uplink traffic on the channel during the period of time after the determining whether the energy is less than or equal to the energy detection threshold may include determining that the channel is available based on the determining of whether the energy is less than or equal to the energy detection threshold and commencing the transmitting of the uplink traffic on the channel during the period of time after determining that the channel is available.

In some examples, selectively transmitting the uplink traffic on the channel during the period of time after the determining whether the energy is less than or equal to the energy detection threshold may include determining that the channel is busy based on the determining of whether the energy is less than or equal to the energy detection threshold and refraining from the transmitting of the uplink traffic on the channel during the period of time after determining that the channel is busy.

FIG. 13 is a flow chart illustrating an example process 1300 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the wireless communication device 900 illustrated in FIG. 9. In some aspects, the wireless communication device may be a user equipment. In some examples, the process 1300 may be carried out by any suitable apparatus or means for carrying out the functions or algorithm described below.

At block 1302, a wireless communication device may receive a first indication of at least one energy detection threshold to use for energy detection on a channel. For example, the ED threshold selection circuitry 942 in cooperation with the communication and processing circuitry 941 and the transceiver 910, shown and described above in connection with FIG. 9, may receive an RC configuration that includes the indication from a BS.

In some examples, receiving the first indication may include receiving a radio resource control (RRC) configuration including the first indication from a base station.

In some examples, the first indication may specify that a highest energy detection threshold of a set of energy detection thresholds is to be used for the energy detection on the channel during the period of time. In some examples, the first indication may specify that a lowest energy detection threshold of a set of energy detection thresholds is to be used for the energy detection on the channel during the period of time. In some examples, the first indication may specify that a highest energy detection threshold of a set of energy detection thresholds is to be used for the energy detection on the channel during the period of time for traffic scheduled by a dynamic grant and for traffic scheduled by a configured grant. In some examples, the first indication may specify that a lowest energy detection threshold of a set of energy detection thresholds is to be used for the energy detection on the channel during the period of time for traffic scheduled by a dynamic grant and for traffic scheduled by a configured grant.

At block 1304, the wireless communication device may receive a grant that schedules a transmission of uplink traffic on the channel during a period of time. For example, the communication and processing circuitry 941 and the transceiver 910, shown and described above in connection with FIG. 9, may receive a grant from a BS.

In some examples, the grant is a dynamic grant. In some examples, the grant is a configured grant. In some examples, the channel may include (e.g., may be) a shared channel. In some examples, the period of time may include (e.g., may be) a channel occupancy time.

At block 1306, the wireless communication device may select an energy detection threshold based on the first indication and the grant. For example, the ED threshold selection circuitry 942, shown and described above in connection with FIG. 9, may use Option 2.2 or 2.3 to select an ED threshold.

In some examples, the first indication may specify that a highest energy detection threshold of a set of energy detection thresholds is to be used for the energy detection on the channel during the period of time for traffic scheduled by a dynamic grant and a lowest energy detection threshold of the set of energy detection thresholds is to be used for the energy detection on the channel during the period of time for traffic scheduled by a configured grant. In some examples, selecting an energy detection threshold based on the first indication and the grant may include selecting the energy detection threshold based on the first indication and a type of the grant.

In some examples, the first indication may specify that a highest energy detection threshold of a set of energy detection thresholds is to be used for the energy detection on the channel during the period of time for traffic scheduled by a configured grant and a lowest energy detection threshold of the set of energy detection thresholds is to be used for the energy detection on the channel during the period of time for traffic scheduled by a dynamic grant. In some examples, selecting an energy detection threshold based on the first indication and the grant may include selecting the energy detection threshold based on the first indication and a type of the grant.

In some examples, the process may further include receiving a defined energy detection threshold from a base station.

In this case, selecting the energy detection threshold may include selecting a threshold different from the defined energy detection threshold.

At block 1308, the wireless communication device may measure energy on the channel. For example, the access control circuitry 943, shown and described above in connection with FIG. 9, may perform an LBT procedure on the channel.

At block 1310, the wireless communication device may determine whether the energy is less than or equal to the energy detection threshold. For example, the access control circuitry 943, shown and described above in connection with FIG. 9, may compared a measured energy level to the ED threshold selected at block 1004.

At block 1312, the wireless communication device may selectively transmit the uplink traffic on the channel during the period of time after the determining whether the energy is less than or equal to the energy detection threshold. For example, the access control circuitry 943 in cooperation with the communication and processing circuitry 941 and the transceiver 910, shown and described above in connection with FIG. 9, may conduct a transmission during a COT if an LBT procedure indicated that the corresponding channel was available. Alternatively, the access control circuitry 943 in cooperation with the communication and processing circuitry 941 and the transceiver 910, shown and described above in connection with FIG. 9, may abstain from transmitting during a COT if an LBT procedure indicated that the corresponding channel was busy.

In some examples, the first indication may include an index into a defined mapping of a plurality of grant types and a plurality of energy detection thresholds. In this case, the plurality of grant types may include a first grant type and a second grant type different from the first grant type, the plurality of energy detection thresholds may include a first energy detection threshold and a second energy detection threshold different from the first energy detection threshold, the first grant type is associated with the first energy detection threshold, and the second grant type is associated with the second energy detection threshold. In some examples, the process may further include receiving the mapping from a base station. In some examples, the process may further include receiving a radio resource control (RRC) configuration including the mapping from a base station. In some examples, selecting an energy detection threshold based on the first indication and the grant may include selecting the energy detection threshold based on the index and a type of the grant.

In some examples, selectively transmitting the uplink traffic on the channel during the period of time after the determining whether the energy is less than or equal to the energy detection threshold may include determining that the channel is available based on the determining of whether the energy is less than or equal to the energy detection threshold and commencing the transmitting of the uplink traffic on the channel during the period of time after determining that the channel is available.

In some examples, selectively transmitting the uplink traffic on the channel during the period of time after the determining whether the energy is less than or equal to the energy detection threshold may include determining that the channel is busy based on the determining of whether the energy is less than or equal to the energy detection threshold and refraining from the transmitting of the uplink traffic on the channel during the period of time after determining that the channel is busy.

Figure 14:
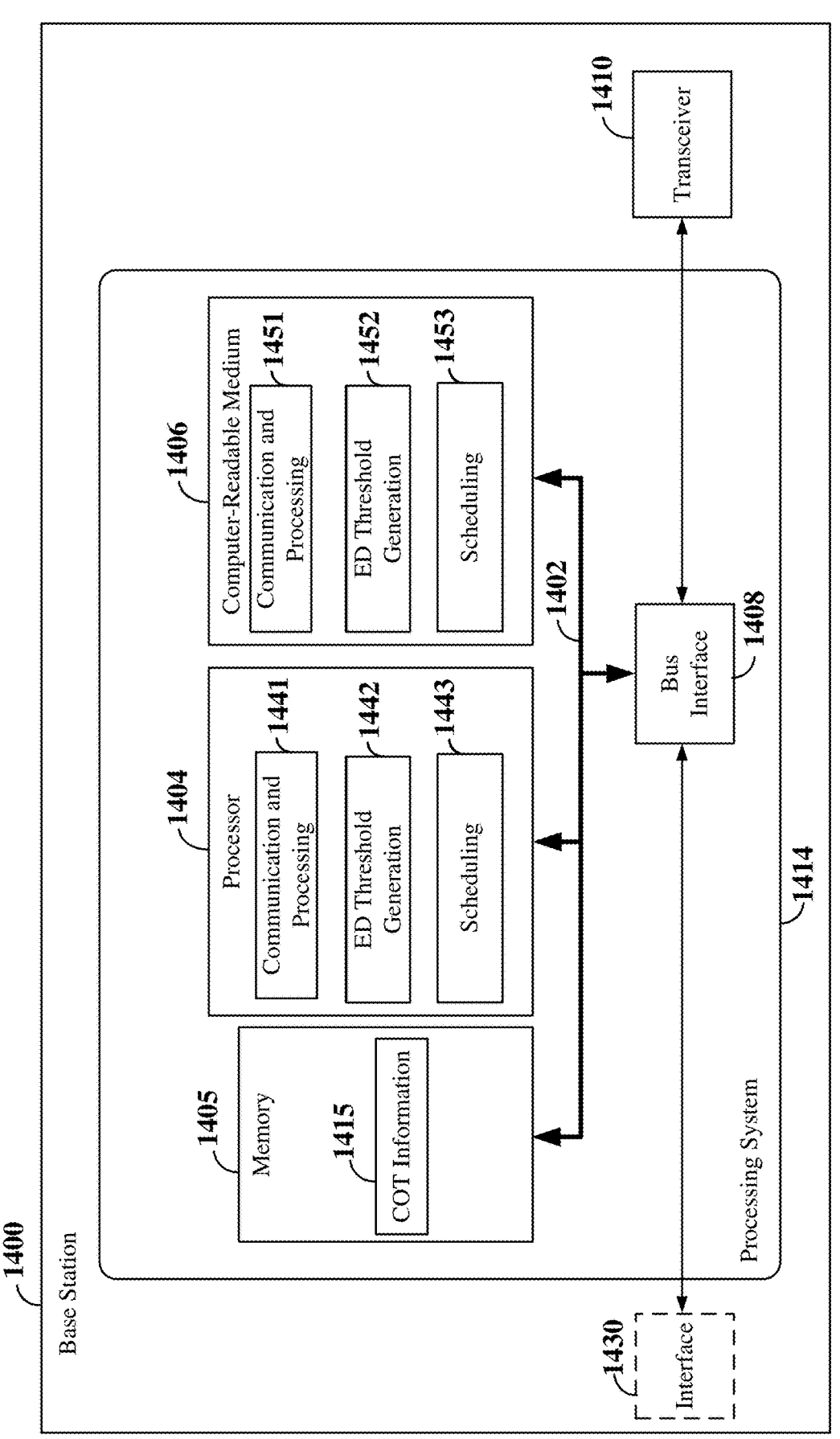
FIG. 14 is a block diagram conceptually illustrating an example of a hardware implementation for a communication device employing a processing system according to some aspects of the disclosure.

FIG. 14 is a conceptual diagram illustrating an example of a hardware implementation for base station (BS) 1400 employing a processing system 1414. In accordance with various aspects of the disclosure, an element, or any portion of an element, or any combination of elements may be implemented with a processing system 1414 that includes one or more processors 1404. In some implementations, the BS 1400 may correspond to one or more of the scheduling entity 108 (e.g., a gNB, a transmit receive point, a UE, etc.) of FIG. 1, the base station 210, 212, 214, or 218 of FIG. 2, the BS 704 of FIG. 7, or the BS 804 of FIG. 8.

The processing system 1414 may be substantially the same as the processing system 1414 illustrated in FIG. 14, including a bus interface 1408, a bus 1402, memory 1405, a processor 1404, and a computer-readable medium 1406. Furthermore, the BS 1400 may include an interface 1430 (e.g., a network interface) that provides a means for communicating with at least one other apparatus within a core network and with at least one radio access network.

The BS 1400 may be configured to perform any one or more of the operations described herein (e.g., as described above in conjunction with FIGS. 1-8 and as described below in conjunction with FIGS. 15-18). In some aspects of the disclosure, the processor 1404, as utilized in the BS 1400, may include circuitry configured for various functions.

In some aspects of the disclosure, the processor 1404 may include communication and processing circuitry 1441. The communication and processing circuitry 1441 may include one or more hardware components that provide the physical structure that performs various processes related to communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. The communication and processing circuitry 1441 may further be configured to execute communication and processing software 1451 included on the computer-readable medium 1406 to implement one or more functions described herein.

In some implementations where the communication involves receiving information, the communication and processing circuitry 1441 may obtain information from a component of the BS 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for receiving.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver

1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., means for transmitting).

The processor 1404 may include ED threshold generation circuitry 1442 configured to perform ED threshold generation-related operations as discussed herein. The ED threshold generation circuitry 1442 may include functionality for a means for determining an ED detection threshold. The ED threshold generation circuitry 1442 may further be configured to execute ED threshold generation software 1452 included on the computer-readable medium 1406 to implement one or more functions described herein.

The processor 1404 may include scheduling circuitry 1443 configured to perform scheduling-related operations as discussed herein (e.g., scheduling an uplink transmission during a COT). The scheduling circuitry 1443 may include functionality for a means for transmitting a grant. The scheduling circuitry 1443 may further be configured to execute scheduling software 1453 included on the computer-readable medium 1406 to implement one or more functions described herein.

Figure 15:
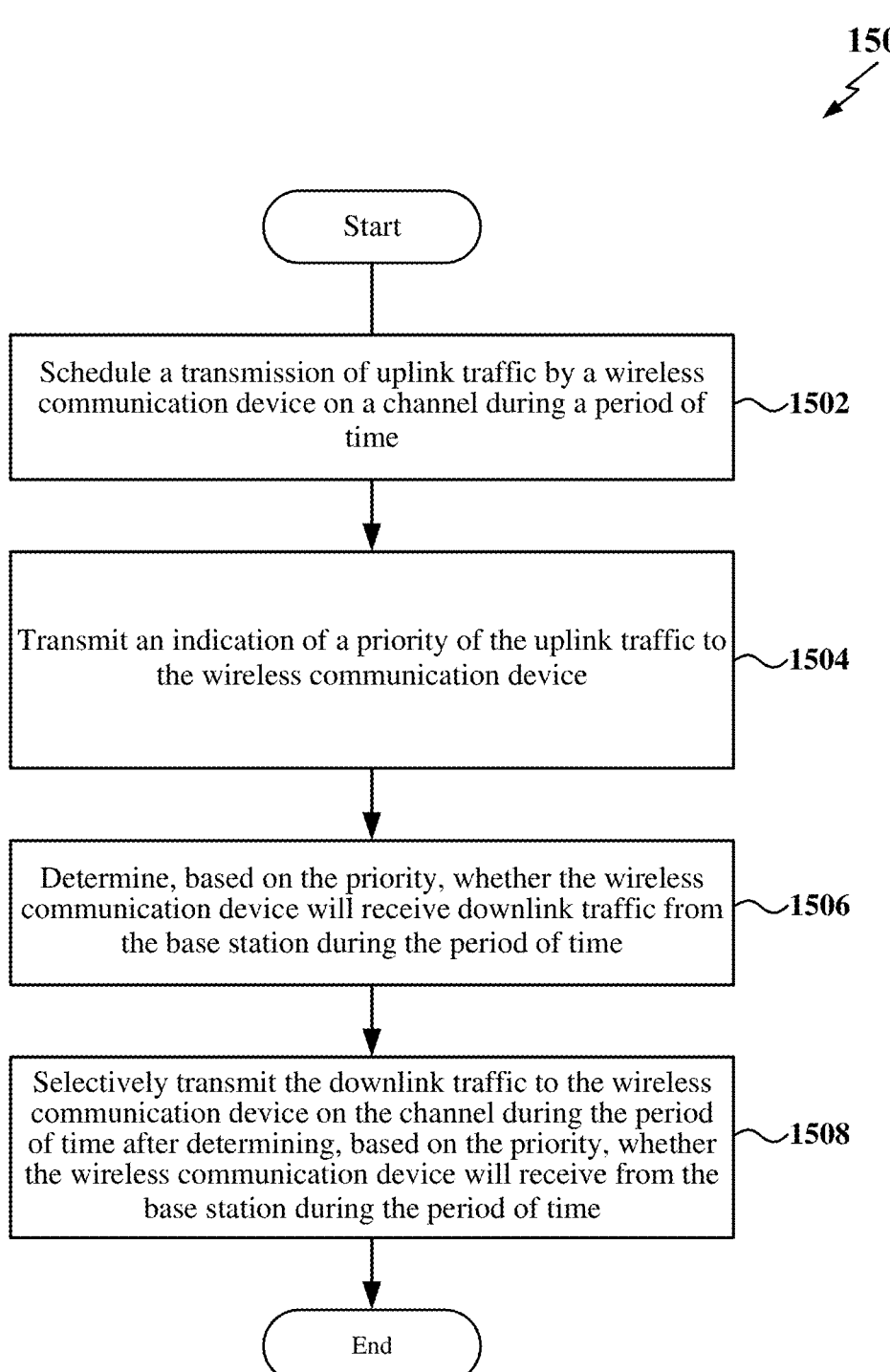
FIG. 15 is a flow chart illustrating an example wireless communication process for scheduling a transmission according to some aspects of the disclosure.

FIG. 15 is a flow chart illustrating another example process 1500 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the BS 1400 illustrated in FIG. 14. In some examples, the process 1500 may be carried out by any suitable apparatus or means for carrying out the functions or algorithm described below.

At block 1502, a BS may schedule a transmission of uplink traffic by a wireless communication device on a channel during a period of time. For example, the scheduling circuitry 1443 in cooperation with the communication and processing circuitry 1441 and the transceiver 1410, shown and described above in connection with FIG. 14, may schedule PUSCH traffic (e.g., with or without a request from the wireless communication device).

In some examples, the channel may include (e.g., may be) a shared channel. In some examples, the period of time may include (e.g., may be) a channel occupancy time.

At block 1504, the BS may transmit an indication of a priority of the uplink traffic to the wireless communication device. For example, the scheduling circuitry 1443 in cooperation with the communication and processing circuitry 1441 and the transceiver 1410, shown and described above in connection with FIG. 14, may send a grant that includes the indication.

In some examples, transmitting the indication may include transmitting the indication in downlink control information. In some examples, transmitting the indication may include transmitting a dynamic grant that includes the indication. In some examples, transmitting the indication may include transmitting a configured grant that includes the indication.

At block 1506, the BS may determine, based on the priority, whether the wireless communication device will receive downlink traffic from the base station during the period of time. For example, the scheduling circuitry 1443, shown and described above in connection with FIG. 14, may determine that the wireless communication device will not share a COT if the priority is associated with a higher ED threshold. In some examples, this block is optional.

At block 1508, a BS may selectively transmit the downlink traffic to the wireless communication device on the channel during the period of time after determining, based on the priority, whether the wireless communication device will receive from the base station during the period of time. For example, the scheduling circuitry 1443 in cooperation with the communication and processing circuitry 1441 and the transceiver 1410, shown and described above in connection with FIG. 14, may transmit if the wireless communication device will share the COT and not transmit otherwise. In some examples, this block is optional.

In some examples, selectively transmitting the downlink traffic to the wireless communication device on the channel during the period of time after determining, based on the priority, whether the wireless communication device will receive from the base station during the period of time may include determining that the wireless communication device will receive from the base station during the period of time and commencing the transmitting of the downlink traffic to the wireless communication device on the channel during the period of time after determining that the wireless communication device will receive from the base station during the period of time.

In some examples, selectively transmitting the downlink traffic to the wireless communication device on the channel during the period of time after determining, based on the priority, whether the wireless communication device will receive from the base station during the period of time may include determining that the wireless communication device will not receive from the base station during the period of time and refraining from the transmitting of the downlink traffic to the wireless communication device on the channel during the period of time after determining that the wireless communication device will not receive from the base station during the period of time.

In some examples, the process may further include determining an energy detection threshold for the wireless communication device to use during the period of time and transmitting the energy detection threshold to the wireless communication device.

FIG. 16 is a flow chart illustrating another example process 1600 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the BS 1400 illustrated in FIG. 14. In some examples, the process 1600 may be carried out by any suitable apparatus or means for carrying out the functions or algorithm described below.

At block 1602, a BS may schedule a transmission of uplink traffic by a wireless communication device on a channel during a period of time. For example, the scheduling circuitry 1443 in cooperation with the communication and processing circuitry 1441 and the transceiver 1410, shown and described above in connection with FIG. 14, may schedule PUSCH traffic (e.g., with or without a request from the wireless communication device).

In some examples, the channel may include (e.g., may be) a shared channel. In some examples, the period of time may include (e.g., may be) a channel occupancy time.

At block 1604, the BS may determine at least one energy detection threshold for prioritized traffic for the wireless communication device to use during the period of time. For example, the ED threshold generation circuitry 1442, shown and described above in connection with FIG. 14, may generate an ED threshold mapping according to in Option 1.2 or 1.3.

In some examples, the at least one energy detection threshold is for dynamic grants and configured grants. In some examples, the at least one energy detection threshold is for dynamic grants or configured grants.

In some examples, determining the at least one energy detection threshold may include determining that the uplink traffic has a higher priority than the downlink traffic and, after determining that the uplink traffic has a higher priority than the downlink traffic, setting the first indication to specify that a highest energy detection threshold of a set of energy detection thresholds is to be used for energy detection on the channel during the period of time.

In some examples, determining the at least one energy detection threshold may include determining that the uplink traffic has a lower priority than the downlink traffic; and, after determining that the uplink traffic has a higher priority than the downlink traffic, setting the first indication to specify that a lowest energy detection threshold of a set of energy detection thresholds is to be used for energy detection on the channel during the period of time.

In some examples, determining the at least one energy detection threshold may include setting the first indication to specify that a highest energy detection threshold of a set of energy detection thresholds is to be used for energy detection on the channel during the period of time for traffic designated as low priority traffic and a lowest energy detection threshold of the set of energy detection thresholds is to be used for the energy detection on the channel during the period of time for traffic designated as high priority traffic. In some examples, the process may further include transmitting a second indication of a priority of the uplink traffic to the wireless communication device.

In some examples, determining the at least one energy detection threshold may include setting the first indication to specify that a highest energy detection threshold of a set of energy detection thresholds is to be used for energy detection on the channel during the period of time for traffic designated as high priority traffic and a lowest energy detection threshold of the set of energy detection thresholds is to be used for the energy detection on the channel during the period of time for traffic designated as low priority traffic. In some examples, the process may further include transmitting a second indication of a priority of the uplink traffic to the wireless communication device.

In some examples, determining the at least one energy detection threshold may include selecting an index into a mapping of a plurality of priorities and a plurality of energy detection thresholds. In this case, the plurality of priorities may include a first priority and a second priority different from the first priority, the plurality of energy detection thresholds may include a first energy detection threshold and a second energy detection threshold different from the first energy detection threshold, the first priority is associated with the first energy detection threshold, and the second priority is associated with the second energy detection threshold. In some examples, transmitting the first indication of the at least one energy detection threshold may include transmitting the index to the wireless communication device.

At block 1606, the BS may transmit a first indication of the at least one energy detection threshold to the wireless communication device. For example, the ED threshold generation circuitry 1442 in cooperation with the communication and processing circuitry 1441 and the transceiver 1410, shown and described above in connection with FIG. 14, may transmit an RRC message that includes the indication.

In some examples, transmitting the first indication may include transmitting a radio resource control (RRC) configuration including the first indication.

At block 1608, a BS may determine, based on the at least one energy detection threshold, whether the wireless communication device will receive downlink traffic from the base station during the period of time. For example, the scheduling circuitry 1443, shown and described above in connection with FIG. 14, may determine that the wireless communication device will not share a COT if the priority is associated with a higher ED threshold. In some examples, this block is optional.

At block 1610, the BS may selectively transmit the downlink traffic to the wireless communication device on the channel during the period of time after determining, based on the at least one energy detection threshold, whether the wireless communication device will receive from the base station during the period of time. For example, the scheduling circuitry 1443 in cooperation with the communication and processing circuitry 1441 and the transceiver 1410, shown and described above in connection with FIG. 14, may transmit if the wireless communication device will share the COT and not transmit otherwise. In some examples, this block is optional.

In some examples, selectively transmitting the downlink traffic to the wireless communication device on the channel during the period of time after determining, based on the at least one energy detection threshold, whether the wireless communication device will receive from the base station during the period of time may include determining that the wireless communication device will receive from the base station during the period of time and commencing the transmitting of the downlink traffic to the wireless communication device on the channel during the period of time after determining that the wireless communication device will receive from the base station during the period of time.

In some examples, selectively transmitting the downlink traffic to the wireless communication device on the channel during the period of time after determining, based on the at least one energy detection threshold, whether the wireless communication device will receive from the base station during the period of time may include determining that the wireless communication device will not receive from the base station during the period of time and refraining from the transmitting of the downlink traffic to the wireless communication device on the channel during the period of time after determining that the wireless communication device will not receive from the base station during the period of time.

FIG. 17 is a flow chart illustrating another example process 1700 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the BS 1400 illustrated in FIG. 14. In some examples, the process 1700 may be carried out by any suitable apparatus or means for carrying out the functions or algorithm described below.

At block 1702, a BS may schedule a transmission of uplink traffic by a wireless communication device on a channel during a period of time. For example, the scheduling circuitry 1443 in cooperation with the communication and processing circuitry 1441 and the transceiver 1410, shown and described above in connection with FIG. 14, may schedule PUSCH traffic (e.g., with or without a request from the wireless communication device).

In some examples, the channel may include (e.g., may be) a shared channel. In some examples, the period of time may include (e.g., may be) a channel occupancy time.

At block 1704, the BS may transmit a grant indicating the scheduling of the transmission to the wireless communication device. For example, the scheduling circuitry 1443 in cooperation with the communication and processing circuitry 1441 and the transceiver 1410, shown and described above in connection with FIG. 14, may transmit a DG or an CG.

At block 1706, the BS may determine, based on a type of the grant, whether the wireless communication device will receive downlink traffic from the base station during the period of time. For example, the scheduling circuitry 1443, shown and described above in connection with FIG. 14, may determine that the wireless communication device will not share a COT if the priority is associated with a higher ED threshold. In some examples, this block is optional.

In some examples, determining, based on the type of the grant, whether the wireless communication device will receive the downlink traffic from the base station during the period of time may include determining, based on the type of the grant, whether the wireless communication device will use a highest energy detection threshold of a defined set of energy detection thresholds for energy detection on the channel during the period of time.

In some examples, determining, based on the type of the grant, whether the wireless communication device will receive the downlink traffic from the base station during the period of time may include determining, based on the type of the grant, whether the wireless communication device will use a lowest energy detection threshold of a defined set of energy detection thresholds for energy detection on the channel during the period of time.

At block 1708, a BS may selectively transmit the downlink traffic to the wireless communication device on the channel during the period of time after determining, based on the type of the grant, whether the wireless communication device will receive from the base station during the period of time. For example, the scheduling circuitry 1443 in cooperation with the communication and processing circuitry 1441 and the transceiver 1410, shown and described above in connection with FIG. 14, may transmit if the wireless communication device will share the COT and not transmit otherwise. In some examples, this block is optional.

In some examples, selectively transmitting the downlink traffic to the wireless communication device on the channel during the period of time after determining, based on the type of the grant, whether the wireless communication device will receive from the base station during the period of time may include determining that the wireless communication device will receive from the base station during the period of time and commencing the transmitting of the downlink traffic to the wireless communication device on the channel during the period of time after determining that the wireless communication device will receive from the base station during the period of time.

In some examples, selectively transmitting the downlink traffic to the wireless communication device on the channel during the period of time after determining, based on the type of the grant, whether the wireless communication device will receive from the base station during the period of time may include determining that the wireless communication device will not receive from the base station during the period of time and refraining from the transmitting of the downlink traffic to the wireless communication device on the channel during the period of time after determining that the wireless communication device will not receive from the base station during the period of time.

In some examples, the process may further include determining an energy detection threshold for the wireless communication device to use during the period of time and transmitting the energy detection threshold to the wireless communication device.

FIG. 18 is a flow chart illustrating another example process 1800 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the BS 1400 illustrated in FIG. 14. In some examples, the process 1800 may be carried out by any suitable apparatus or means for carrying out the functions or algorithm described below.

At block 1802, a BS may schedule a transmission of uplink traffic by a wireless communication device on a channel during a period of time. For example, the scheduling circuitry 1443 in cooperation with the communication and processing circuitry 1441 and the transceiver 1410, shown and described above in connection with FIG. 14, may schedule PUSCH traffic (e.g., with or without a request from the wireless communication device).

In some examples, the channel may include (e.g., may be) a shared channel. In some examples, the period of time may include (e.g., may be) a channel occupancy time.

At block 1804, the BS may transmit a grant indicating the scheduling of the transmission to the wireless communication device. For example, the scheduling circuitry 1443 in cooperation with the communication and processing circuitry 1441 and the transceiver 1410, shown and described above in connection with FIG. 14, may transmit a DG or an CG.

At block 1806, the BS may determine at least one energy detection threshold for the wireless communication device to use during the period of time based on at least one grant type. For example, the ED threshold generation circuitry 1442, shown and described above in connection with FIG. 14, may generate an ED threshold mapping according to in Option 2.2 or 2.3.

In some examples, determining the at least one energy detection threshold to use during the period of time based on the at least one grant type may include determining that the uplink traffic has a higher priority than the downlink traffic and, after determining that the uplink traffic has a higher priority than the downlink traffic, setting the first indication to specify that a highest energy detection threshold of a set of energy detection thresholds is to be used for energy detection on the channel during the period of time.

In some examples, determining the at least one energy detection threshold to use during the period of time based on the at least one grant type may include determining that the uplink traffic has a lower priority than the downlink traffic and, after determining that the uplink traffic has a higher priority than the downlink traffic, setting the first indication to specify that a lowest energy detection threshold of a set of energy detection thresholds is to be used for energy detection on the channel during the period of time.

In some examples, determining the at least one energy detection threshold to use during the period of time based on the at least one grant type may include setting the first indication to specify that a highest energy detection threshold of a set of energy detection thresholds is to be used for energy detection on the channel during the period of time for traffic scheduled by a dynamic grant and a lowest energy detection threshold of the set of energy detection thresholds is to be used for the energy detection on the channel during the period of time for traffic scheduled by a configured grant.

In some examples, determining the at least one energy detection threshold to use during the period of time based on the at least one grant type may include setting the first indication to specify that a highest energy detection threshold of a set of energy detection thresholds is to be used for energy detection on the channel during the period of time for traffic scheduled by a configured grant and a lowest energy detection threshold of the set of energy detection thresholds is to be used for the energy detection on the channel during the period of time for traffic scheduled by a dynamic grant.

In some examples, determining the at least one energy detection threshold may include selecting an index into a mapping of a plurality of grant types and a plurality of energy detection thresholds. In this case, the plurality of grant types may include a first grant type and a second grant type different from the first grant type, the plurality of energy detection thresholds may include a first energy detection threshold and a second energy detection threshold different from the first energy detection threshold, the first grant type is associated with the first energy detection threshold, and the second grant type is associated with the second energy detection threshold. In some examples, transmitting the first indication of the at least one energy detection threshold may include transmitting the index to the wireless communication device.

At block 1808, a BS may transmit a first indication of the at least one energy detection threshold to the wireless communication device. For example, the ED threshold generation circuitry 1442 in cooperation with the communication and processing circuitry 1441 and the transceiver 1410, shown and described above in connection with FIG. 14, may transmit an RRC message that includes the indication.

In some examples, transmitting the first indication may include transmitting a radio resource control (RRC) configuration including the first indication.

At block 1810, the BS may determine, based on the at least one grant type, whether the wireless communication device will receive downlink traffic from the base station during the period of time. For example, the scheduling circuitry 1443, shown and described above in connection with FIG. 14, may determine that the wireless communication device will not share a COT if the priority is associated with a higher ED threshold. In some examples, this block is optional.

At block 1812, the BS may selectively transmit the downlink traffic to the wireless communication device on the channel during the period of time after determining, based on the at least one energy detection threshold, whether the wireless communication device will receive from the base station during the period of time. For example, the scheduling circuitry 1443 in cooperation with the communication and processing circuitry 1441 and the transceiver 1410, shown and described above in connection with FIG.

14, may transmit if the wireless communication device will share the COT and not transmit otherwise. In some examples, this block is optional.

In some examples, selectively transmitting the downlink traffic to the wireless communication device on the channel during the period of time after determining, based on the at least one energy detection threshold, whether the wireless communication device will receive from the base station during the period of time may include determining that the wireless communication device will receive from the base station during the period of time and commencing the transmitting of the downlink traffic to the wireless communication device on the channel during the period of time after determining that the wireless communication device will receive from the base station during the period of time.

In some examples, selectively transmitting the downlink traffic to the wireless communication device on the channel during the period of time after determining, based on the at least one energy detection threshold, whether the wireless communication device will receive from the base station during the period of time may include determining that the wireless communication device will not receive from the base station during the period of time and refraining from the transmitting of the downlink traffic to the wireless communication device on the channel during the period of time after determining that the wireless communication device will not receive from the base station during the period of time.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 7, 8, 9, and 14 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims Moreover, nothing disclosed herein is intended to be dedicated to the public regardless of whether such disclosure is explicitly recited in the claims.

The invention claimed is:

1. A method of communication at a wireless communication device, the method comprising:
    receiving an index value associated with a mapping that maps a first priority to a first set of energy detection thresholds according to the index value, and further maps a second priority to a second set of energy detection thresholds according to the index value, wherein the second priority is different from the first priority;
    receiving a grant that schedules uplink traffic for transmission on a channel during a channel occupancy time (COT);
    selecting an energy detection threshold based on the index value, the mapping, and a priority of the uplink traffic;
    measuring energy on the channel; and
    transmitting the uplink traffic on the channel during the COT based on the measured energy being less than or equal to the energy detection threshold.

2. The method of claim 1, wherein:
    the channel comprises a shared channel.

3. The method of claim 1, wherein receiving the grant comprises:
    receiving the grant in downlink control information from a network entity.

4. The method of claim 1, wherein receiving the grant comprises:
    receiving a dynamic grant from a network entity.

5. The method of claim 1, wherein receiving the grant comprises:
    receiving a configured grant from a network entity.

6. The method of claim 1, further comprising:
    receiving a defined energy detection threshold from a network entity;
    wherein selecting the energy detection threshold comprises selecting a threshold different from the defined energy detection threshold.

7. The method of claim 1, wherein transmitting the uplink traffic on the channel during the COT based on the measured energy being less than or equal to the energy detection threshold comprises:
    determining that the channel is available based on the measured energy being less than or equal to the energy detection threshold; and
    commencing the transmitting of the uplink traffic on the channel during the COT after determining that the channel is available.

8. A method of communication at a network entity, the method comprising:
    transmitting, to a wireless communication device, an index value associated with a mapping that maps a first priority to a first set of energy detection thresholds according to the index value, and further maps a second priority to a second set of energy detection thresholds according to the index value, wherein the second priority is different from the first priority;
    transmitting, to the wireless communication device, a grant that schedules a transmission of uplink traffic by a the wireless communication device on a channel during a channel occupancy time (COT); and
    refraining from transmitting downlink traffic to the wireless communication device on the channel during the COT scheduled for the transmission of the uplink traffic based on the index value and a priority of the uplink traffic being indicative of disabled COT sharing.

9. The method of claim 8, wherein:
    the channel comprises a shared channel.

10. The method of claim 8, wherein transmitting the grant comprises:
    transmitting the grant in downlink control information.

11. The method of claim 8, wherein transmitting the grant comprises:
    transmitting a dynamic grant.

12. The method of claim 8, wherein transmitting the grant comprises:
    transmitting a configured grant.

13. The method of claim 8, further comprising:

determining an energy detection threshold for the wireless communication device to use during the COT; and transmitting the energy detection threshold to the wireless communication device.

14. The method of claim 8, wherein refraining from transmitting the downlink traffic to the wireless communication device on the channel during the COT scheduled for the transmission of the uplink traffic comprises:

identifying an energy detection threshold based on the priority; and refraining from the transmitting of the downlink traffic to the wireless communication device on the channel during the COT scheduled for the transmission of the uplink traffic based on the energy detection threshold being indicative of disabled COT sharing.

15. A wireless communication device, comprising:

one or more memories that store processor-executable code; and one or more processors configured to execute the processor-executable code and cause the wireless communication device to:

receive an index value associated with a mapping that maps a first priority to a first set of energy detection thresholds according to the index value, and further maps a second priority to a second set of energy detection thresholds according to the index value, wherein the second priority is different from the first priority;

receive a grant that schedules uplink traffic for transmission on a channel during a channel occupancy time (COT);

select an energy detection threshold based on the index value, the mapping, and a priority of the uplink traffic;

measure energy on the channel; and transmit the uplink traffic on the channel during the COT based on the measured energy being less than or equal to the energy detection threshold.

16. A network entity, comprising:

one or more memories that store processor-executable code; and one or more processors configured to execute the processor-executable code and cause the network entity to:

transmit, to a wireless communication device, an index value associated with a mapping that maps a first priority to a first set of energy detection thresholds according to the index value, and further maps a second priority to a second set of energy detection thresholds according to the index value, wherein the second priority is different from the first priority;

transmit, to the wireless communication device, a grant that schedules a transmission of uplink traffic by the wireless communication device on a channel during a channel occupancy time (COT); and refrain from transmission of downlink traffic to the wireless communication device on the channel during the COT scheduled for the transmission of the uplink traffic based on the index value and a priority of the uplink traffic being indicative of disabled COT sharing.

17. The method of claim 1, wherein:

a first value of the index value maps the first priority to a first energy detection threshold and further maps the second priority to a second energy detection threshold; and a second value of the index value maps the first priority to the second energy detection threshold and further maps the second priority to the first energy detection threshold.

18. The method of claim 8, wherein:

a first value of the index value maps the first priority to a first energy detection threshold and further maps the second priority to a second energy detection threshold; and a second value of the index value maps the first priority to the second energy detection threshold and further maps the second priority to the first energy detection threshold.

* * * * *